US011955758B2

(12) United States Patent
Burris et al.

(10) Patent No.: US 11,955,758 B2
(45) Date of Patent: Apr. 9, 2024

(54) COAXIAL CABLE CONNECTOR ASSEMBLIES WITH OUTER CONDUCTOR ENGAGEMENT FEATURES AND METHODS FOR USING THE SAME

(71) Applicant: CORNING OPTICAL COMMUNICATIONS RF LLC, Glendale, AZ (US)

(72) Inventors: Donald Andrew Burris, Peoria, AZ (US); David Jeffrey Malouf, Surprise, AZ (US)

(73) Assignee: CORNING OPTICAL COMMUNICATIONS RF LLC, Glendale, AZ (US)

( * ) Notice: Subject to any disclaimer, the term of this patent is extended or adjusted under 35 U.S.C. 154(b) by 0 days.

(21) Appl. No.: 17/352,571

(22) Filed: Jun. 21, 2021

(65) Prior Publication Data

US 2021/0408711 A1 Dec. 30, 2021

Related U.S. Application Data

(60) Provisional application No. 63/043,164, filed on Jun. 24, 2020.

(51) Int. Cl.
*H01R 9/05* (2006.01)
*H01R 24/40* (2011.01)

(52) U.S. Cl.
CPC ............... *H01R 9/05* (2013.01); *H01R 24/40* (2013.01)

(58) Field of Classification Search
None
See application file for complete search history.

(56) References Cited

U.S. PATENT DOCUMENTS

| | | | | |
|---|---|---|---|---|
| 7,114,990 | B2 * | 10/2006 | Bence .................... | H01R 24/44 439/322 |
| 9,515,432 | B2 | 12/2016 | Purdy et al. | |
| 9,548,472 | B2 | 1/2017 | Yang et al. | |
| 9,859,669 | B2 * | 1/2018 | Chen ...................... | H01R 24/40 |

* cited by examiner

*Primary Examiner* — Ross N Gushi
(74) *Attorney, Agent, or Firm* — Tamika A. Crawl-Bey

(57) ABSTRACT

A coaxial cable connector assembly including a rear body, a coupler rotatably engaged with the rear body, where the coupler defines an inner channel extending through the coupler between a front portion of the coupler and a rear portion of the coupler, and a nominal portion defining a nominal inner span along the inner channel, and a retainer engaged with the coupler and the rear body, where the retainer couples the coupler to the rear body, where at least one of the retainer and the coupler defines an engagement passage having a non-uniform span, where at least a portion of the engagement passage extends inwardly from the nominal portion of the coupler and is structurally configured to contact an outer conductor of the coaxial cable forming an electrical pathway between the thread of the coupler and the outer conductor of the coaxial cable.

6 Claims, 21 Drawing Sheets

COAXIAL CABLE CONNECTOR ASSEMBLIES WITH OUTER CONDUCTOR ENGAGEMENT FEATURES AND METHODS FOR USING THE SAME

CROSS-REFERENCE TO RELATED APPLICATIONS

This application claims the benefit of priority under 35 U.S.C. § 119 of U.S. Provisional Application Ser. No. 63/043,164, filed Jun. 24, 2020, the content of which is relied upon and incorporated herein by reference in its entirety.

BACKGROUND

The present disclosure relates to coaxial cable connector assemblies, and more particularly to coaxial cable connector assemblies including outer conductor engagement features.

Coaxial cable connector assemblies, such as F-type connectors, are conventionally used to connect a coaxial cable to a device, such as a television or the like. Coaxial cables generally include an inner conductor, and an outer conductor extending around the inner conductor. In some configurations, signals are transmitted through the inner conductor, and the outer conductor may be maintained at earth potential.

Conventional cable connector assemblies generally connect the inner conductor and the outer conductor of the coaxial cable to a receiving port of the receiving device.

BRIEF SUMMARY

In some instances, it may be difficult for a user, such as an installation technician, to fully tighten the threads of a connector assembly to the receiving port, which may result in a loose connection between the receiving port and the outer conductor of the coaxial cable. Accordingly, there is a recognized need for coaxial cable connector assemblies with features that facilitate improved electrical connection to the outer conductor of a coaxial cable. The subject matter of the present disclosure addresses this need and presents embodiments including coaxial cable connector assemblies with outer conductor engagement features that assist in making an electrical connection between the outer conductor of a coaxial cable and a receiving port of a device.

In a first aspect A1, the present disclosure provides a coaxial cable connector assembly includes a rear body structurally configured to be coupled to a coaxial cable, and a coupler rotatably engaged with and positioned forward of the rear body, where the coupler defines an inner channel extending through the coupler between a front portion of the coupler and a rear portion of the coupler positioned opposite the front portion, a thread at the front portion of the coupler, where the thread is structurally configured to couple the coaxial cable connector assembly to a port of a device, a nominal portion defining a nominal inner span along the inner channel, and an outer conductor engagement portion that tapers inwardly from the nominal portion that extends forwardly along the inner channel to the front portion of the coupler, where the outer conductor engagement portion is structurally configured to contact an outer conductor of the coaxial cable forming an electrical pathway between the thread of the coupler and the outer conductor of the coaxial cable.

In a second aspect A2, the present disclosure provides the coaxial cable connector assembly of aspect A1, further including a retainer engaged with the coupler and the rear body, where the retainer couples the rear body to the coupler.

In a third aspect A3, the present disclosure provides the coaxial cable connector assembly of aspect A2, where the retainer defines a tube portion coaxial with the inner channel of the coupler, and a flange extending outwardly from the tube portion and engaged with the rear body.

In a fourth aspect A4, the present disclosure provides the coaxial cable connector assembly of aspect A3, where the flange of the retainer is engaged with an annular ridge of the rear body.

In a fifth aspect A5, the present disclosure provides the coaxial cable connector assembly of either of aspects A3 or A4, where the retainer further defines an annular bevel positioned between the flange and the tube portion.

In a sixth aspect A6, the present disclosure provides the coaxial cable connector assembly of aspect A5, where the coupler defines a longitudinal axis extending between the front portion and the rear portion of the coupler, and where the annular bevel is oriented inwardly toward the longitudinal axis.

In a seventh aspect A7, the present disclosure provides the coaxial cable connector assembly of any of aspects A2-A6, where the retainer includes an annular retaining ring that extends around the coupler.

In an eighth aspect A8, the present disclosure provides the coaxial cable connector assembly of any of aspects A1-A7, where the rear body defines a cable channel extending through the rear body, and where the coaxial cable connector assembly further includes a post extending at least partially along the cable channel of the rear body.

In a ninth aspect A9, the present disclosure provides the coaxial cable connector assembly of aspect A8, where the post defines a post body extending along the cable channel and a post flange that extends outwardly from the post body.

In a tenth aspect A10, the present disclosure provides the coaxial cable connector assembly of aspect A9, further including a retainer engaged with the coupler and the rear body where the retainer couples the rear body to the coupler, and where the post flange abuts the retainer along a longitudinal axis extending between the front portion and the rear portion of the coupler.

In an eleventh aspect A11, the present disclosure provides, the coaxial cable connector assembly of either of aspects A9 or A10, further including a retainer engaged with the coupler and the rear body, the retainer defining a tube portion and a flange extending outward from the tube portion and engaging the rear body, where the retainer couples the rear body to the coupler, and where the post flange engages the tube portion of the retainer.

In a twelfth aspect A12, the present disclosure provides the coaxial cable connector assembly of any of aspects A1-A11, where the coupler defines a body engagement feature and the rear body defines a coupler engagement feature engaged with and retains the body engagement feature of the coupler.

In a thirteenth aspect A13, the present disclosure provides the coaxial cable connector assembly of aspect A12, where the body engagement feature defines a recess extending into the coupler and the coupler engagement feature defines a protrusion extending outwardly from the rear body.

In a fourteenth aspect A14, the present disclosure provides the coaxial cable connector assembly of any of aspects A1-A13, further including a contact ring positioned on the inner channel of the coupler, where the contact ring is structurally configured to engage the outer conductor of the coaxial cable.

In a fifteenth aspect A15, the present disclosure provides the coaxial cable connector assembly of any of aspects A1-A14, further including a conductive gasket positioned on the inner channel of the coupler, where the conductive gasket is structurally configured to engage the outer conductor of the coaxial cable.

In a sixteenth aspect A16, the present disclosure provides the coaxial cable connector assembly of any of aspects A1-A15, where the coupler further defines one or more barbs extending inwardly from the nominal portion of the coupler, where the one or more barbs are structurally configured to engage the outer conductor of the coaxial cable.

In a seventeenth aspect A17, the present disclosure provides the coaxial cable connector assembly of any of aspects A1-A16, where the rear body defines a cable channel extending through the rear body and where the coaxial cable connector assembly further includes an annular press-ring that is selectively insertable within the cable channel to couple the coaxial cable to the rear body.

In an eighteenth aspect A18, the present disclosure provides the coaxial cable connector assembly of any of aspects A1-A17, where the rear body includes an outer body member and an inner body member, where the rear body is positionable in a disengaged position in which the outer body member is spaced apart from the inner body member, and an engaged position, in which the outer body member is engaged with the inner body member and at least one of the inner body member and the outer body member deforms inwardly.

In a nineteenth aspect A19, the present disclosure provides the coaxial cable connector assembly of aspect A18, where the outer body member includes an inner portion and an outer portion, and where the inner portion is inwardly deformed when the rear body is in the engaged position.

In a twentieth aspect A20, the present disclosure provides the coaxial cable connector assembly of any of aspects A1-A19, where the rear body includes an outer body member and an inner body member, where the rear body is positionable in a disengaged position, in which the outer body member is spaced apart from the inner body member, and an engaged position, in which a taper of the outer body member is engaged with the inner body member and inwardly deforms at least a portion of the inner body member.

In a twenty-first aspect A21, the present disclosure provides the coaxial cable connector assembly of any of aspects A1-A20, further including an adhesive coupled to the rear body.

In a twenty-second aspect A22, the present disclosure provides the coaxial cable connector assembly of any of aspects A1-A21, where the rear body defines one or more crimp members extending outwardly from the rear body, where the one or more crimp members are structurally configured to plastically deform inwardly to couple the coaxial cable to the rear body.

In a twenty-third aspect A23, the present disclosure provides a coaxial cable connector assembly including a rear body structurally configured to couple the coaxial cable connector assembly to a coaxial cable, a coupler rotatably engaged with and positioned forward of the rear body, where the coupler defines an inner channel extending through the coupler between a front portion of the coupler and a rear portion of the coupler positioned opposite the front portion, a thread at the front portion of the coupler, where the thread is structurally configured to couple the coaxial cable connector assembly to a port of a device, and a retainer engaged with the coupler and the rear body, where the retainer couples the coupler to the rear body, the retainer defining a tube portion coaxial with the inner channel of the coupler, and a flange extending outwardly from the tube portion and engaged with the rear body, and where at least one of the retainer and the coupler defines a nominal portion defining a nominal inner span, and an outer conductor engagement portion that tapers inwardly from the nominal portion moving forward along the inner channel to the front portion of the coupler, where the outer conductor engagement portion is structurally configured to contact an outer conductor of the coaxial cable forming an electrical pathway between the thread of the coupler and the outer conductor of the coaxial cable.

In a twenty-fourth aspect A24, the present disclosure provides the coaxial cable connector assembly of aspect A23, where the coupler defines the outer conductor engagement portion.

In a twenty-fifth aspect A25, the present disclosure provides the coaxial cable connector assembly of either of aspects A23 or A24, where the retainer defines the outer conductor engagement portion.

In a twenty-sixth aspect A26, the present disclosure provides the coaxial cable connector assembly of aspect A25, where the coupler defines a retainer engaging thread and the retainer defines a coupler engaging thread that is engaged with the retainer engaging thread.

In a twenty-seventh aspect A27, the present disclosure provides the coaxial cable connector assembly of aspect A26, where the retainer is movable with respect to the coupler along a longitudinal axis extending between the front portion and the rear portion of the coupler.

In a twenty-eighth aspect A28, the present disclosure provides the coaxial cable connector assembly of aspect A27, where the retainer defines a forward flange engaged with the coupler and oriented to face forward from the front portion of the coupler.

In a twenty-ninth aspect A29, the present disclosure provides the coaxial cable connector assembly of any of aspects A23-A28, where the flange of the retainer is engaged with an annular ridge of the rear body.

In a thirtieth aspect A30, the present disclosure provides the coaxial cable connector assembly of any of aspects A23-A29, where the retainer further defines an annular bevel positioned between the flange and the tube portion.

In a thirty-first aspect A31, the present disclosure provides the coaxial cable connector assembly of aspect A30, where the coupler defines a longitudinal axis extending between the front portion and the rear portion of the coupler, and where the annular bevel is oriented inwardly toward the longitudinal axis.

In a thirty-second aspect A32, the present disclosure provides the coaxial cable connector assembly of any of aspects A23-A31, where the retainer includes an annular retaining ring that extends around the coupler.

In a thirty-third aspect A33, the present disclosure provides the coaxial cable connector assembly of any of aspects A23-A32, where the rear body defines a cable channel extending through the rear body, and where the coaxial cable connector assembly further includes a post extending at least partially along the cable channel of the rear body.

In a thirty-fourth aspect A34, the present disclosure provides the coaxial cable connector assembly of aspect A33, where the post defines a post body extending along the cable channel and a post flange that extends outwardly from the post body.

In a thirty-fifth aspect A35, the present disclosure provides the coaxial cable connector assembly of aspect A34, where the post flange abuts the retainer along a longitudinal axis extending between the front portion and the rear portion of the coupler.

In a thirty-sixth aspect A36, the present disclosure provides the coaxial cable connector assembly of aspect A34, where the post flange engages the tube portion of the retainer.

In a thirty-seventh aspect A37, the present disclosure provides the coaxial cable connector assembly of any of aspects A23-A36, further including a contact ring positioned on the inner channel of the coupler, where the contact ring is structurally configured to engage the outer conductor of the coaxial cable.

In a thirty-eighth aspect A38, the present disclosure provides the coaxial cable connector assembly of any of aspects A23-A37, further including a conductive gasket positioned on the inner channel of the coupler, where the conductive gasket is structurally configured to engage the outer conductor of the coaxial cable.

In a thirty-ninth aspect A39, the present disclosure provides the coaxial cable connector assembly of any of aspects A23-A38, where the coupler further defines one or more barbs extending inwardly from the nominal portion of the coupler, where the one or more barbs are structurally configured to engage the outer conductor of the coaxial cable.

In a fortieth aspect A40, the present disclosure provides the coaxial cable connector assembly of any of aspects A23-A39, where the rear body defines a cable channel extending through the rear body and where the coaxial cable connector assembly further includes an annular press-ring that is selectively insertable within the cable channel to couple the coaxial cable to the rear body.

In a forty-first aspect A41, the present disclosure provides the coaxial cable connector assembly of any of aspects A23-A40, where the rear body includes an outer body member and an inner body member, where the rear body is positionable in a disengaged position in which the outer body member is spaced apart from the inner body member, and an engaged position, in which the outer body member is engaged with the inner body member and at least one of the inner body member and the outer body member deforms inwardly.

In a forty-second aspect A42, the present disclosure provides the coaxial cable connector assembly of aspect A41, where the outer body member includes an inner portion and an outer portion, and where the inner portion is inwardly deformed when the rear body is in the engaged position.

In a forty-third aspect A43, the present disclosure provides the coaxial cable connector assembly of any of aspects A23-A42, where the rear body includes an outer body member and an inner body member, where the rear body is positionable in a disengaged position, in which the outer body member is spaced apart from the inner body member, and an engaged position, in which a taper of the outer body member is engaged with the inner body member and inwardly deforms at least a portion of the inner body member.

In a forty-fourth aspect A44, the present disclosure provides the coaxial cable connector assembly of any of aspects A23-A43, further including an adhesive coupled to the rear body.

In a forty-fifth aspect A45, the present disclosure provides a coaxial cable assembly including a coaxial cable including an inner conductor, a dielectric material surrounding the inner conductor, an outer conductor surrounding the dielectric material, an outer braid positioned outwardly from and engaged with the outer conductor, and an outer jacket surrounding at least a portion of the outer conductor, and a coaxial cable connector assembly including a rear body coupled to the coaxial cable, and a coupler rotatably engaged with and positioned forward of the rear body, where the coupler defines an inner channel extending through the coupler between a front portion of the coupler and a rear portion of the coupler, a thread at the front portion of the coupler, where the thread is structurally configured to couple the coaxial cable connector assembly to a port of a device, a nominal portion defining a nominal inner span along the inner channel, and an outer conductor engagement portion that tapers inwardly from the nominal portion moving forward along the inner channel to the front portion of the coupler, where the outer conductor engagement portion contacts the outer conductor of the coaxial cable and forms an electrical pathway between the thread of the coupler and the outer conductor of the coaxial cable.

In a forty-sixth aspect A46, the present disclosure provides the coaxial cable assembly of aspect A45, where the outer conductor includes a conductive foil extending around the dielectric material.

In a forty-seventh aspect A47, the present disclosure provides a coaxial cable connector assembly including a rear body structurally configured to be coupled to a coaxial cable, a coupler rotatably engaged with and positioned forward of the rear body, where the coupler defines an inner channel extending through the coupler between a front portion of the coupler and a rear portion of the coupler positioned opposite the front portion, a thread at the front portion of the coupler, where the thread is structurally configured to couple the coaxial cable connector assembly to a port of a device, and a nominal portion defining a nominal inner span along the inner channel, and a retainer engaged with the coupler and the rear body, where the retainer couples the coupler to the rear body, and where at least one of the retainer and the coupler defines a radial bulge extending inwardly from the nominal portion of the coupler, where the radial bulge is structurally configured to contact an outer conductor of the coaxial cable and forming an electrical pathway between the thread of the coupler and the outer conductor of the coaxial cable.

In a forty-eighth aspect A48, the present disclosure provides the coaxial cable connector assembly of aspect A47, where the retainer defines the radial bulge.

In a forty-ninth aspect A49, the present disclosure provides the coaxial cable connector assembly of either of aspects A47-A48, where the radial bulge defines a rearward portion, a forward portion spaced apart from the rearward portion in an axial direction, and a crest that is positioned between and extends inwardly from the rearward portion and the forward portion.

In a fiftieth aspect A50, the present disclosure provides the coaxial cable connector assembly of any of aspects A47-A49, where the radial bulge is a first radial bulge and at least one of the retainer and the coupler defines at least a second radial bulge.

In a fifty-first aspect A51, the present disclosure provides the coaxial cable connector assembly of aspect A50, where the first radial bulge and the second radial bulge define an inner surface having a serpentine shape.

In a fifty-second aspect A52, the present disclosure provides the coaxial cable connector assembly of either of aspects A50 or A51, where the retainer defines the first radial bulge and the second radial bulge.

In a fifty-third aspect A53, the present disclosure provides the coaxial cable connector assembly of any of aspects A47-A52, where the retainer defines a flange and a tube portion, where the flange extends radially outward from the tube portion.

In a fifty-fourth aspect A54, the present disclosure provides the coaxial cable connector assembly of aspect A53, where the flange of the retainer is engaged with an annular ridge of the rear body.

In a fifty-fifth aspect A55, the present disclosure provides the coaxial cable connector assembly of either of aspects A53 or A54, where the retainer further defines an annular bevel positioned between the flange and the tube portion.

In a fifty-sixth aspect A56, the present disclosure provides the coaxial cable connector assembly of aspect A55, where the coupler defines a longitudinal axis extending between the front portion and the rear portion of the coupler, and where the annular bevel is oriented inwardly toward the longitudinal axis.

In a fifty-seventh aspect A57, the present disclosure provides the coaxial cable connector assembly of any of aspects A47-A56, where the retainer includes an annular retaining ring that extends around the coupler.

In a fifty-eighth aspect A58, the present disclosure provides the coaxial cable connector assembly of any of aspects A47-A57, where the rear body defines a cable channel extending through the rear body, and where the coaxial cable connector assembly further includes a post extending at least partially along the cable channel of the rear body.

In a fifty-ninth aspect A59, the present disclosure provides the coaxial cable connector assembly of aspect A58, where the post defines a post body extending along the cable channel and a post flange that extends outwardly from the post body.

In a sixtieth aspect A60, the present disclosure provides the coaxial cable connector assembly of aspect A59, where the post flange abuts the retainer along a longitudinal axis extending between the front portion and the rear portion of the coupler.

In a sixty-first aspect A61, the present disclosure provides the coaxial cable connector assembly of aspect A59, where the post flange engages a tube portion of the retainer.

In a sixty-second aspect A62, the present disclosure provides the coaxial cable connector assembly of any of aspects A47-A61, further including a contact ring positioned on the inner channel of the coupler, where the contact ring is structurally configured to engage the outer conductor of the coaxial cable.

In a sixty-third aspect A63, the present disclosure provides the coaxial cable connector assembly of any of aspects A47-A62, further including a conductive gasket positioned on the inner channel of the coupler, where the conductive gasket is structurally configured to engage the outer conductor of the coaxial cable.

In a sixty-fourth aspect A64, the present disclosure provides the coaxial cable connector assembly of any of aspects A47-A64, where the coupler further defines one or more barbs extending inwardly from the nominal portion of the coupler, where the one or more barbs are structurally configured to engage the outer conductor of the coaxial cable.

In a sixty-fifth aspect A65, the present disclosure provides the coaxial cable connector assembly of any of aspects A47-A64, where the rear body defines a cable channel extending through the rear body and where the coaxial cable connector assembly further includes an annular press-ring that is selectively insertable within the cable channel to couple the coaxial cable to the rear body.

In a sixty-sixth aspect A66, the present disclosure provides the coaxial cable connector assembly of any of aspects A47-A65, where the rear body includes an outer body member and an inner body member, where the rear body is positionable in a disengaged position in which the outer body member is spaced apart from the inner body member, and an engaged position, in which the outer body member is engaged with the inner body member and at least one of the inner body member and the outer body member deforms inwardly.

In a sixty-seventh aspect A67, the present disclosure provides the coaxial cable connector assembly of aspect A66, where the outer body member includes an inner portion and an outer portion, and where the inner portion is inwardly deformed when the rear body is in the engaged position.

In a sixth-eighth aspect A68, the present disclosure provides the coaxial cable connector assembly of any of aspects A47-A67, where the rear body includes an outer body member and an inner body member, where the rear body is positionable in a disengaged position, in which the outer body member is spaced apart from the inner body member, and an engaged position, in which a taper of the outer body member is engaged with the inner body member and inwardly deforms at least a portion of the inner body member.

In a sixty-ninth aspect A69, the present disclosure provides, the coaxial cable connector assembly of any of aspects A47-A68, further including an adhesive coupled to the rear body.

In a seventieth aspect A70, the present disclosure provides a coaxial cable assembly including a coaxial cable including an inner conductor, a dielectric material surrounding the inner conductor, an outer conductor surrounding the dielectric material, an outer braid positioned outwardly from and engaged with the outer conductor, and an outer jacket surrounding at least a portion of the outer conductor, and a coaxial cable connector assembly including a rear body coupled to the coaxial cable, a coupler rotatably engaged with and positioned forward of the rear body, where the coupler defines an inner channel extending through the coupler between a front portion of the coupler and a rear portion of the coupler positioned opposite the front portion, a thread at the front portion of the coupler, where the thread is structurally configured to couple the coaxial cable connector assembly to a port of a device, and a nominal portion defining a nominal inner span along the inner channel, and a retainer engaged with the coupler and the rear body, where the retainer couples the coupler to the rear body, and where at least one of the retainer and the coupler defines a radial bulge extending inwardly from the nominal portion of the coupler, where the radial bulge contacts the outer conductor of the coaxial cable forming an electrical pathway between the thread of the coupler and the outer conductor of the coaxial cable.

In a seventy-first aspect A71, the present disclosure provides the coaxial cable assembly of aspect A70, where the retainer defines the radial bulge.

In a seventy-second aspect A72, the present disclosure provides the coaxial cable assembly of either of aspects A70 or A71, where the radial bulge defines a rearward portion, a forward portion spaced apart from the rearward portion in an axial direction, and a crest that is positioned between and extends inwardly from the rearward portion and the forward portion.

In a seventy-third aspect A73, the present disclosure provides the coaxial cable assembly of any of aspects A70-A72, where the radial bulge is a first radial bulge and at least one of the retainer and the coupler defines at least a second radial bulge.

In a seventy-fourth aspect A74, the present disclosure provides the coaxial cable assembly of any of aspects A70-A73, where the outer conductor includes a conductive foil extending around the dielectric material.

In a seventy-fifth aspect A75, the present disclosure provides a coaxial cable connector assembly including a rear body structurally configured to be coupled to a coaxial cable, a coupler rotatably engaged with and positioned forward of the rear body, where the coupler defines an inner channel extending through the coupler between a front portion of the coupler and a rear portion of the coupler positioned opposite the front portion, a thread at the front portion of the coupler, where the thread is structurally configured to couple the coaxial cable connector assembly to a port of a device, and a nominal portion defining a nominal inner span along the inner channel, and a retainer engaged with the coupler and the rear body, where the retainer couples the coupler to the rear body, where at least one of the retainer and the coupler defines one or more protrusions extending inwardly from the nominal portion of the coupler, where the one or more protrusions are structurally configured to contact an outer conductor of the coaxial cable forming an electrical pathway between the thread of the coupler and the outer conductor of the coaxial cable.

In a seventy-sixth aspect A76, the present disclosure provides the coaxial cable connector assembly of aspect A75, where the retainer defines the one or more protrusions.

In a seventy-seventh aspect A77, the present disclosure, the coaxial cable connector assembly of either of aspects A75 or A76, where the one or more protrusions are aligned with one another in an axial direction.

In a seventy-eighth aspect A78, the present disclosure provides the coaxial cable connector assembly of any of aspects A75-A77, where the one or more protrusions are offset from one another in an axial direction.

In a seventy-ninth aspect A79, the present disclosure provides the coaxial cable connector assembly of any of aspects A75-A78, where the retainer defines a flange and a tube portion, where the flange extends radially outward from the tube portion.

In an eightieth aspect A80, the present disclosure provides the coaxial cable connector assembly of aspect A79, where the flange of the retainer is engaged with an annular ridge of the rear body.

In an eighty-first aspect A81, the present disclosure provides the coaxial cable connector assembly of either of aspects A79 or A80, where the retainer further defines an annular bevel positioned between the flange and the tube portion.

In an eighty-second aspect A82, the present disclosure provides the coaxial cable connector assembly of aspect A81, where the coupler defines a longitudinal axis extending between the front portion and the rear portion of the coupler, and where the annular bevel is oriented inwardly toward the longitudinal axis.

In an eighty-third aspect A83, the present disclosure provides the coaxial cable connector assembly of any of aspects A75-A82, where the retainer includes an annular retaining ring that extends around the coupler.

In an eighty-fourth aspect A84, the present disclosure provides the coaxial cable connector assembly of any of aspects A75-A83, where the rear body defines a cable channel extending through the rear body, and where the coaxial cable connector assembly further includes a post extending at least partially along the cable channel of the rear body.

In an eighty-fifth aspect A85, the present disclosure provides the coaxial cable connector assembly of aspect A84, where the post defines a post body extending along the cable channel and a post flange that extends outwardly from the post body.

In an eighty-sixth aspect A86, the present disclosure provides the coaxial cable connector assembly of aspect A85, where the post flange abuts the retainer along a longitudinal axis extending between the front portion and the rear portion of the coupler.

In an eighty-seventh aspect A87, the present disclosure provides the coaxial cable connector assembly of aspect A85, where the post flange engages a tube portion of the retainer.

In an eighty-eighth aspect A88, the present disclosure provides the coaxial cable connector assembly of any of aspects A75-A87, further including a contact ring positioned on the inner channel of the coupler, where the contact ring is structurally configured to engage the outer conductor of the coaxial cable.

In an eighty-ninth aspect A89, the present disclosure provides the coaxial cable connector assembly of any of aspects A75-A88, further including a conductive gasket positioned on the inner channel of the coupler, where the conductive gasket is structurally configured to engage the outer conductor of the coaxial cable.

In a ninetieth aspect A90, the present disclosure provides the coaxial cable connector assembly of any of aspects A75-A89, where the coupler further defines one or more barbs extending inwardly from the nominal portion of the coupler, where the one or more barbs are structurally configured to engage the outer conductor of the coaxial cable.

In a ninety-first aspect A91, the present disclosure provides the coaxial cable connector assembly of any of aspects A75-A90, where the rear body defines a cable channel extending through the rear body and where the coaxial cable connector assembly further includes an annular press-ring that is selectively insertable within the cable channel to couple the coaxial cable to the rear body.

In a ninety-second aspect A92, the present disclosure provides the coaxial cable connector assembly of any of aspects A75-A91, where the rear body includes an outer body member and an inner body member, where the rear body is positionable in a disengaged position in which the outer body member is spaced apart from the inner body member, and an engaged position, in which the outer body member is engaged with the inner body member and at least one of the inner body member and the outer body member deforms inwardly.

In a ninety-third aspect A93, the present disclosure provides the coaxial cable connector assembly of aspect A92, where the outer body member includes an inner portion and an outer portion, and where the inner portion is inwardly deformed when the rear body is in the engaged position.

In a ninety-fourth aspect A94, the present disclosure provides the coaxial cable connector assembly of any of aspects A75-A93, where the rear body includes an outer body member and an inner body member, where the rear body is positionable in a disengaged position, in which the outer body member is spaced apart from the inner body member, and an engaged position, in which a taper of the outer body member is engaged with the inner body member and inwardly deforms at least a portion of the inner body member.

In a ninety-fifth aspect A95, the present disclosure provides the coaxial cable connector assembly of any of aspects A75-A94, further including an adhesive coupled to the rear body.

In a ninety-sixth aspect A96, the present disclosure provides a coaxial cable assembly including a coaxial cable including an inner conductor, a dielectric material surrounding the inner conductor, an outer conductor surrounding the dielectric material, an outer braid positioned outwardly from and engaged with the outer conductor, and an outer jacket surrounding at least a portion of the outer conductor, and a coaxial cable connector assembly including a rear body coupled to the coaxial cable, a coupler rotatably engaged with and positioned forward of the rear body, where the coupler defines an inner channel extending through the coupler between a front portion of the coupler and a rear portion of the coupler positioned opposite the front portion, a thread at the front portion of the coupler, where the thread is structurally configured to couple the coaxial cable connector assembly to a port of a device, and a nominal portion defining a nominal inner span along the inner channel, and a retainer engaged with the coupler and the rear body, where the retainer couples the coupler to the rear body, where at least one of the retainer and the coupler defines one or more protrusions extending inwardly from the nominal portion of the coupler, where the one or more protrusions contact the outer conductor of the coaxial cable forming an electrical pathway between the thread of the coupler and the outer conductor of the coaxial cable.

In a ninety-seventh aspect A97, the present disclosure provides the coaxial cable assembly of aspect A96, where the retainer defines the one or more protrusions.

In a ninety-eighth aspect A98, the present disclosure provides the coaxial cable assembly of either aspect A96 or A97, where the one or more protrusions are aligned with one another in an axial direction.

In a ninety-ninth aspect A99, the present disclosure provides the coaxial cable assembly of any of aspects A96-A98, where the one or more protrusions are offset from one another in an axial direction.

In a hundredth aspect A100, the present disclosure provides the coaxial cable assembly of any of aspects A96-A99, where the outer conductor includes a conductive foil extending around the dielectric material.

In a hundred and first aspect A101, the present disclosure provides a coaxial cable connector assembly including a rear body structurally configured to be coupled to a coaxial cable, a coupler rotatably engaged with and positioned forward of the rear body, where the coupler defines an inner channel extending through the coupler between a front portion of the coupler and a rear portion of the coupler positioned opposite the rear portion, and a thread at the front portion of the coupler, where the thread is structurally configured to couple the coaxial cable connector assembly to a port of a device, and a nominal portion defining a nominal inner span along the inner channel, and a retainer engaged with the coupler and the rear body, where the retainer couples the coupler to the rear body, where at least one of the retainer and the coupler defines an engagement passage having a non-uniform span, where at least a portion of the engagement passage extends inwardly from the nominal portion of the coupler and is structurally configured to contact an outer conductor of the coaxial cable forming an electrical pathway between the thread of the coupler and the outer conductor of the coaxial cable.

In a hundred and second aspect A102, the present disclosure provides the coaxial cable connector assembly of aspect A101, where the retainer defines the engagement passage.

In a hundred and third aspect A103, the present disclosure provides the coaxial cable connector assembly of either of aspects A101 or A102, where the engagement passage defines an ovular cross-section.

In a hundred and fourth aspect A104, the present disclosure provides the coaxial cable connector assembly of any of aspects A101-A103, where the engagement passage defines a polygonal cross-section.

In a hundred and fifth aspect A105, the present disclosure provides the coaxial cable connector assembly of any of aspects A101-A104, where the retainer defines a flange and a tube portion, and where the flange extends radially outward from the tube portion.

In a hundred and sixth aspect A106, the present disclosure provides the coaxial cable connector assembly of aspect A105, where the flange of the retainer is engaged with an annular ridge of the rear body.

In a hundred and seventh aspect A107, the present disclosure provides the coaxial cable connector assembly of either of aspects A105 or A106, where the retainer further defines an annular bevel positioned between the flange and the tube portion.

In a hundred and eighth aspect A108, the present disclosure provides the coaxial cable connector assembly of aspect A107, where the coupler defines a longitudinal axis extending between the front portion and the rear portion of the coupler, and where the annular bevel is oriented inwardly toward the longitudinal axis.

In a hundred and ninth aspect A109, the present disclosure provides the coaxial cable connector assembly of any of aspects A101-A108, where the retainer includes an annular retaining ring that extends around the coupler.

In a hundred and tenth aspect A110, the present disclosure provides the coaxial cable connector assembly of any of aspects A101-A109, where the rear body defines a cable channel extending through the rear body, and where the coaxial cable connector assembly further includes a post extending at least partially along the cable channel of the rear body.

In a hundred and eleventh aspect A111, the present disclosure provides the coaxial cable connector assembly of aspect A110, where the post defines a post body extending along the cable channel and a post flange that extends outwardly from the post body.

In a hundred and twelfth aspect A112, the present disclosure provides the coaxial cable connector assembly of aspect A111, where the post flange abuts the retainer along a longitudinal axis extending between the front portion and the rear portion of the coupler.

In a hundred and thirteenth aspect A113, the present disclosure provides the coaxial cable connector assembly of aspect A111, where the post flange engages a tube portion of the retainer.

In a hundred and fourteenth aspect A114, the present disclosure provides the coaxial cable connector assembly of any of aspects A101-A113, further including a contact ring positioned on the inner channel of the coupler, where the contact ring is structurally configured to engage the outer conductor of the coaxial cable.

In a hundred and fifteenth aspect A115, the present disclosure provides the coaxial cable connector assembly of any of aspects A101-A114, further including a conductive gasket positioned on the inner channel of the coupler, where the conductive gasket is structurally configured to engage the outer conductor of the coaxial cable.

In a hundred and sixteenth aspect A116, the present disclosure provides the coaxial cable connector assembly of any of aspects A101-A115, where the coupler further defines one or more barbs extending inwardly from the nominal portion of the coupler, where the one or more barbs are structurally configured to engage the outer conductor of the coaxial cable.

In a hundred and seventeenth aspect A117, the present disclosure provides, the coaxial cable connector assembly of any of aspects A101-A116, where the rear body defines a cable channel extending through the rear body and where the coaxial cable connector assembly further includes an annular press-ring selectively insertable within the cable channel to couple the coaxial cable to the rear body.

In a hundred and eighteenth aspect A118, the present disclosure provides the coaxial cable connector assembly of any of aspects A101-A117, where the rear body includes an outer body member and an inner body member, where the rear body is positionable in a disengaged position in which the outer body member is spaced apart from the inner body member, and an engaged position, in which the outer body member is engaged with the inner body member and at least one of the inner body member and the outer body member deforms inwardly.

In a hundred and nineteenth aspect A119, the present disclosure provides the coaxial cable connector assembly of aspect A118, where the outer body member includes an inner portion and an outer portion, and where the inner portion is inwardly deformed when the rear body is in the engaged position.

In a hundred and twentieth aspect A120, the present disclosure provides the coaxial cable connector assembly of any of aspects A101-A119, where the rear body includes an outer body member and an inner body member, where the rear body is positionable in a disengaged position, in which the outer body member is spaced apart from the inner body member, and an engaged position, in which a taper of the outer body member is engaged with the inner body member and inwardly deforms at least a portion of the inner body member.

In a hundred and twenty-first aspect A121, the present disclosure provides the coaxial cable connector assembly of any of aspects A101-A120, further including an adhesive coupled to the rear body.

In a hundred and twenty-second aspect A122, the present disclosure provides a coaxial cable assembly including a coaxial cable including an inner conductor, a dielectric material surrounding the inner conductor, an outer conductor surrounding the dielectric material, an outer braid positioned outwardly from and engaged with the outer conductor, and an outer jacket surrounding at least a portion of the outer conductor, and a coaxial cable connector assembly including a rear body coupled to the coaxial cable, a coupler rotatably engaged with and positioned forward of the rear body, where the coupler defines an inner channel extending through the coupler between a front portion of the coupler and a rear portion of the coupler positioned opposite the front portion, a thread at the front portion of the coupler, where the thread is structurally configured to couple the coaxial cable connector assembly to a port of a device, and a nominal portion defining a nominal inner span along the inner channel, and a retainer engaged with the coupler and the rear body, where the retainer couples the coupler to the rear body, where at least one of the retainer and the coupler defines an engagement passage having a non-uniform span, where at least a portion of the engagement passage extends inwardly from the nominal portion of the coupler and contacts the outer conductor of the coaxial cable forming an electrical pathway between the thread of the coupler and the outer conductor of the coaxial cable.

In a hundred and twenty-third aspect A123, the present disclosure provides the coaxial cable assembly of aspect A122, where the retainer defines the engagement passage.

In a hundred and twenty-fourth aspect A124, the present disclosure provides the coaxial cable assembly of either of aspects A122 or A123, where the engagement passage defines an ovular cross-section.

In a hundred and twenty-fifth aspect A125, the present disclosure provides the coaxial cable assembly of either of aspects A122 or A123, where the engagement passage defines a polygonal cross-section.

In a hundred and twenty-sixth aspect A126, the present disclosure provides the coaxial cable assembly of any of aspects A122-A125, where the outer conductor includes a conductive foil extending around the dielectric material.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure may be indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1A:
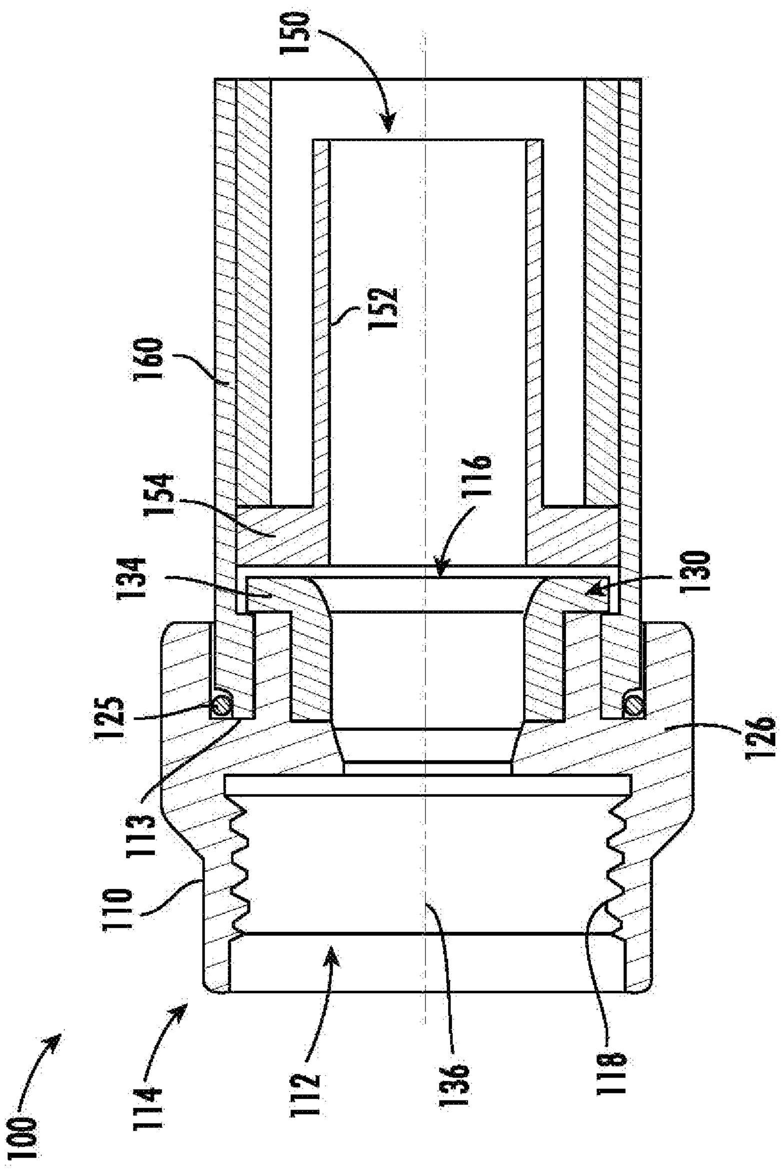
FIG. 1A schematically depicts a section view of coaxial cable connector assembly, according to one or more embodiments shown and described herein.

Embodiments described herein are generally directed to coaxial cable connector assemblies including outer conductor engagement features. In particular, embodiments disclosed herein are directed to coaxial cable connector assemblies including outer conductor engagement features that electrically couple threads of a coupler of the coaxial cable connector assembly to an outer conductor of a coaxial cable. By electrically coupling the outer conductor of the coaxial cable to the threads of the coupler, coaxial cable connector assemblies described herein may make an electrical connection between the port of a device and the outer conductor of the coaxial cable, even if the coupler of the coaxial cable connector assembly is not fully seated on the port of the device. These and other embodiments of coaxial cable connector assemblies are disclosed in greater detail herein with reference to the appended figures.

Now referring to FIGS. 1A-1C and 2, a coaxial cable connector assembly 100 and a coaxial cable 10 are schematically depicted. The coaxial cable connector assembly 100 generally includes a coupler 110 and a rear body 160 positioned rearward of the coupler 110. In embodiments, the coupler 110 is rotatably engaged with the rear body 160, such that the coupler 110 may rotate about the rear body 160. The rear body 160 is generally coupled to the coaxial cable 10, as described in greater detail herein.

In embodiments, the coupler 110 defines an inner channel 112 extending between a front portion 114 of the coupler 110 and a rear portion 116 of the coupler 110 positioned opposite the front portion 114. In embodiments, the coupler 110 includes a thread 118 at the front portion 114 of the coupler 110, which is structurally configured to engage a corresponding thread of a port of a device, such as a television, a cable box, or the like. The coupler 110 may be formed of a material suitable to conduct electricity, such as copper, aluminum, or the like, and in embodiments the coupler 110 is electrically coupled to an outer conductor of the coaxial cable 10.

Figure 2:
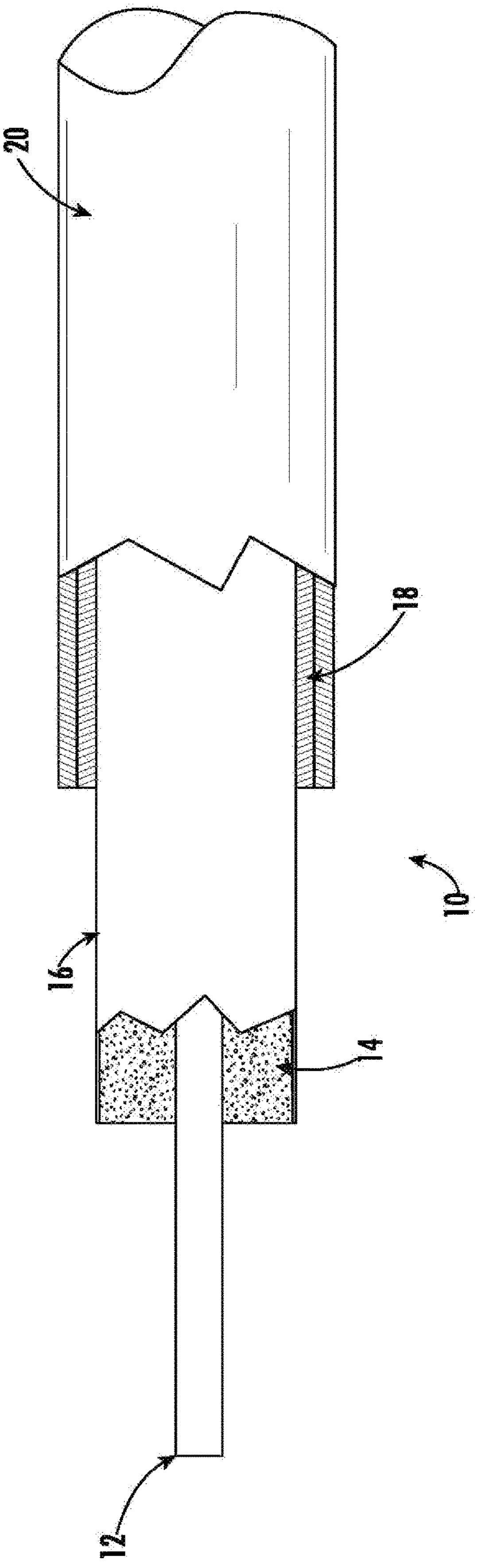
FIG. 2 schematically depicts a coaxial cable, according to one or more embodiments shown and described herein.
Figure 3B:
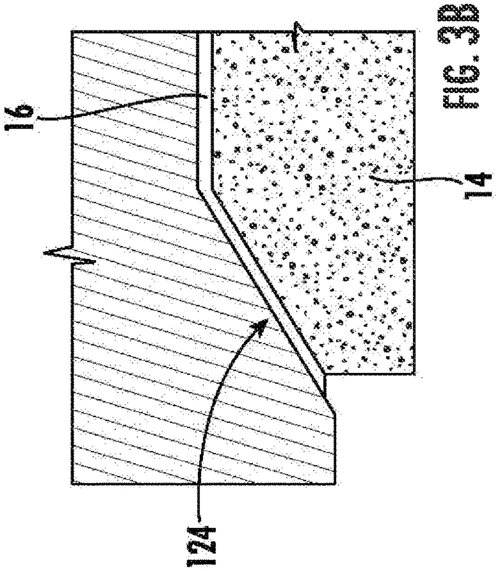
FIG. 3B schematically depicts an enlarged view of the conductor engagement portion of FIG. 3A, according to one or more embodiments shown and described herein.
Figure 3A:
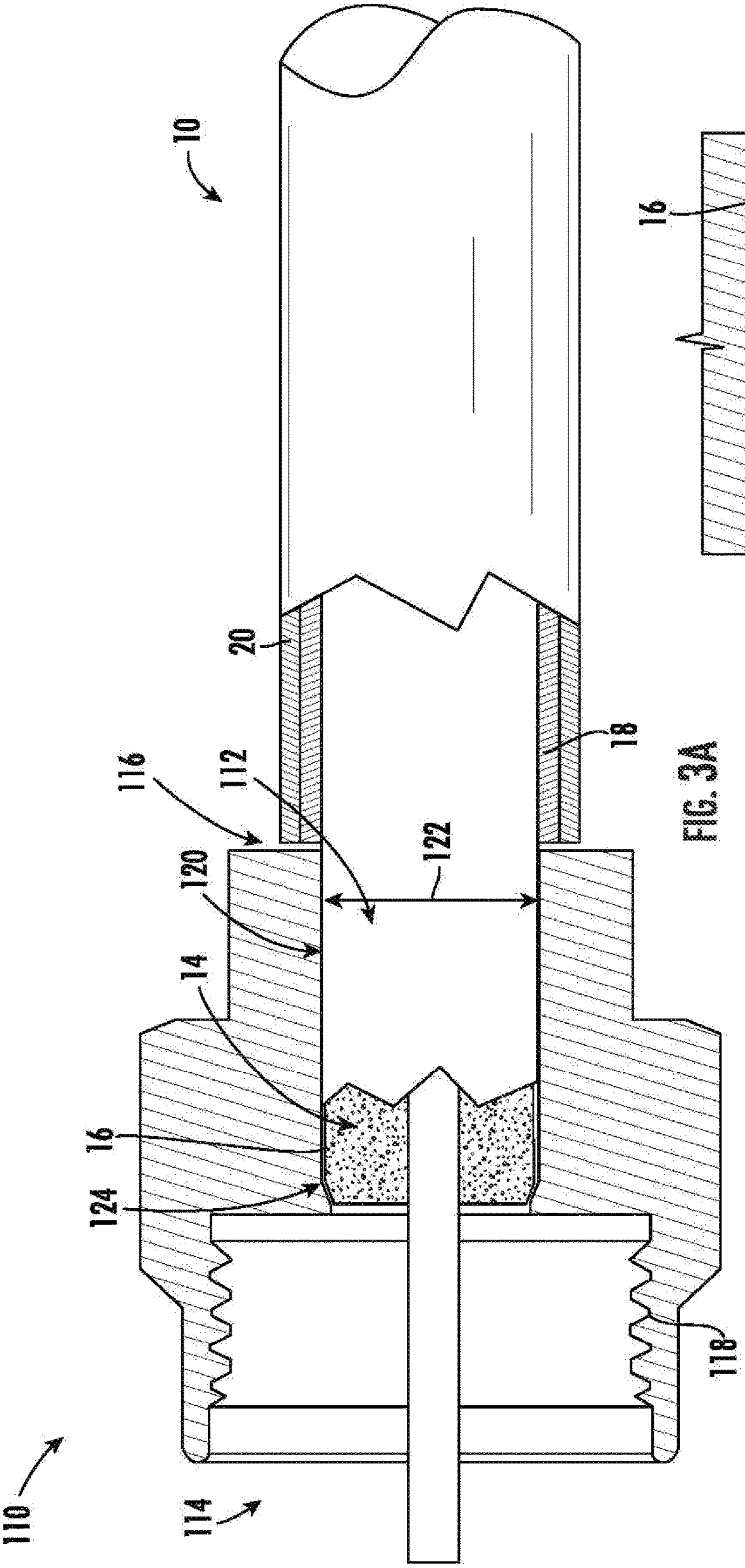
FIG. 3A schematically depicts a section view of a conductor engagement portion of the coupler of FIG. 1A engaged with the coaxial cable of FIG. 2, according to one or more embodiments shown and described herein.

For example and referring to FIGS. 2 and 3A, an enlarged view of the coaxial cable 10 and an enlarged section view of the coupler 110 with the coaxial cable 10 are depicted, respectively. The coaxial cable 10 generally includes an inner conductor 12 surrounded by a dielectric material 14. In embodiments, electrical signals may be passed through the inner conductor 12, such as to a device connected to the coaxial cable 10, and the inner conductor 12 may be formed of a conductive material, such as copper, aluminum, or the like. The dielectric material 14 generally electrically insulates the inner conductor 12, and may include a polymer or the like. In some embodiments, the dielectric material 14 is generally elastic and may allow the dielectric material 14 to elastically deform under force, thereby allowing the coaxial cable 10 to bend.

In embodiments, the coaxial cable 10 further includes an outer conductor surrounding the dielectric material 14. For example, in embodiments, the coaxial cable 10 includes an outer conductor 16 surrounding the dielectric material 14. In some configurations, the outer conductor 16 may be maintained at a ground potential while electrical signals are transmitted through the inner conductor 12. The outer conductor 16 may generally be formed of a conductive material, such as aluminum foil, copper foil, or the like. In some embodiments, the coaxial cable 10 further includes an outer braid 18 positioned outwardly from and engaged with the outer conductor 16. In embodiments, the outer braid 18 may be formed of a conductive material, such as braided copper wire, braided aluminum wire or the like. In embodiments, the outer braid 18 may assist in shielding the inner conductor 12 of the coaxial cable 10.

The coaxial cable 10, in embodiments, further includes an outer jacket 20 surrounding at least a portion of the outer conductor 16 and/or the outer braid 18. The outer jacket 20 may be formed of a polymer or the like and may generally protect the coaxial cable 10 from environmental elements, such as moisture.

In the embodiment depicted in FIG. 3A the coupler 110 defines a nominal portion 120, defining a nominal inner span 122, extending along the inner channel 112. The nominal portion 120 is referenced herein as being "nominal" to help distinguish it from the various distinctive features defined on the inner channel 112. Without these distinctive surface features, the nominal portion 120 would form a relatively uniform and continuous surface of the coupler 110.

Referring to FIGS. 3A and 3B, the coupler 110 defines an outer conductor engagement portion 124 that tapers inwardly from the nominal portion 120. In particular, in the embodiment depicted in FIGS. 3A and 3B, the outer conductor engagement portion 124 defines a taper that extends forward along the inner channel 112 toward the front portion 114 of the coupler 110. In embodiments, the outer conductor engagement portion 124 is structurally configured to contact the outer conductor 16 of the coaxial cable 10, forming an electrical pathway between the thread 118 of the coupler 110 and the outer conductor 16 of the coaxial cable 10. While in the embodiment depicted in FIGS. 3A and 3B, the outer conductor engagement portion 124 is depicted as contacting the outer conductor 16, it should be understood that in some embodiments, the coupler 110 may also engage the outer braid 18 of the coaxial cable 10.

In some embodiments, a span of the outer conductor engagement portion 124 is less than a span of the outer conductor 16 of the coaxial cable 10. In these embodiments, as the coaxial cable 10 is inserted into the coupler 110, the outer conductor engagement portion 124 may at least partially and inwardly deform the outer conductor 16 and/or the dielectric material 14 as the outer conductor 16 of the coaxial cable 10 engages the outer conductor engagement portion 124 of the coupler 110. As described above, the dielectric material 14 may include a generally elastic material, and accordingly, as the outer conductor 16 and/or the dielectric material 14 are inwardly deformed by the outer conductor engagement portion 124, the dielectric material 14 may elastically bias the outer conductor 16 outwardly, which may assist in maintaining physical contact between the outer conductor 16 of the coaxial cable 10 and the outer conductor engagement portion 124 of the coupler 110. By maintaining physical contact between the outer conductor 16 of the coaxial cable 10 and the outer conductor engagement portion 124 of the coupler 110, electrical communication between the outer conductor 16 and the coupler 110 may be maintained.

Figure 1B:
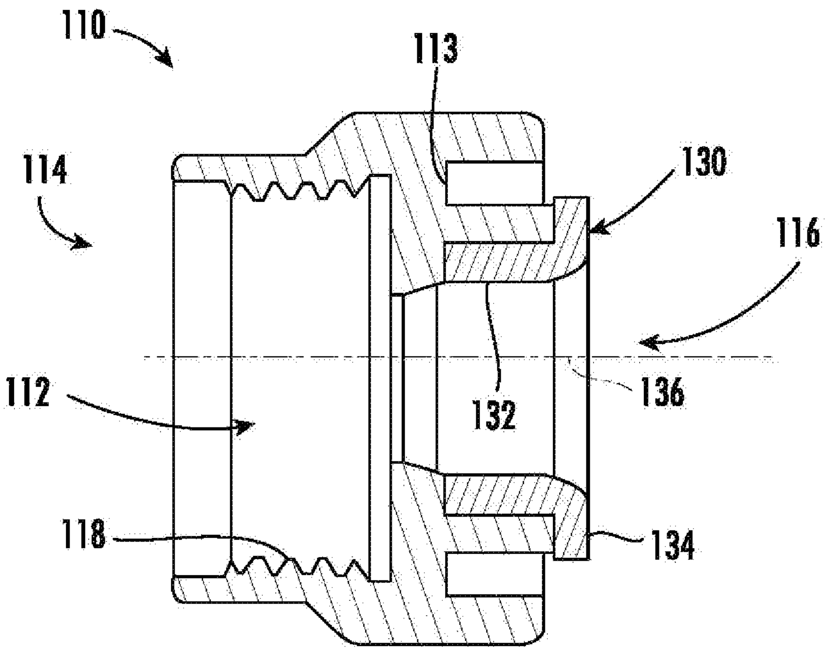
FIG. 1B schematically depicts a coupler of the coaxial cable connector assembly of FIG. 1A, according to one or more embodiments shown and described herein.
Figure 4:
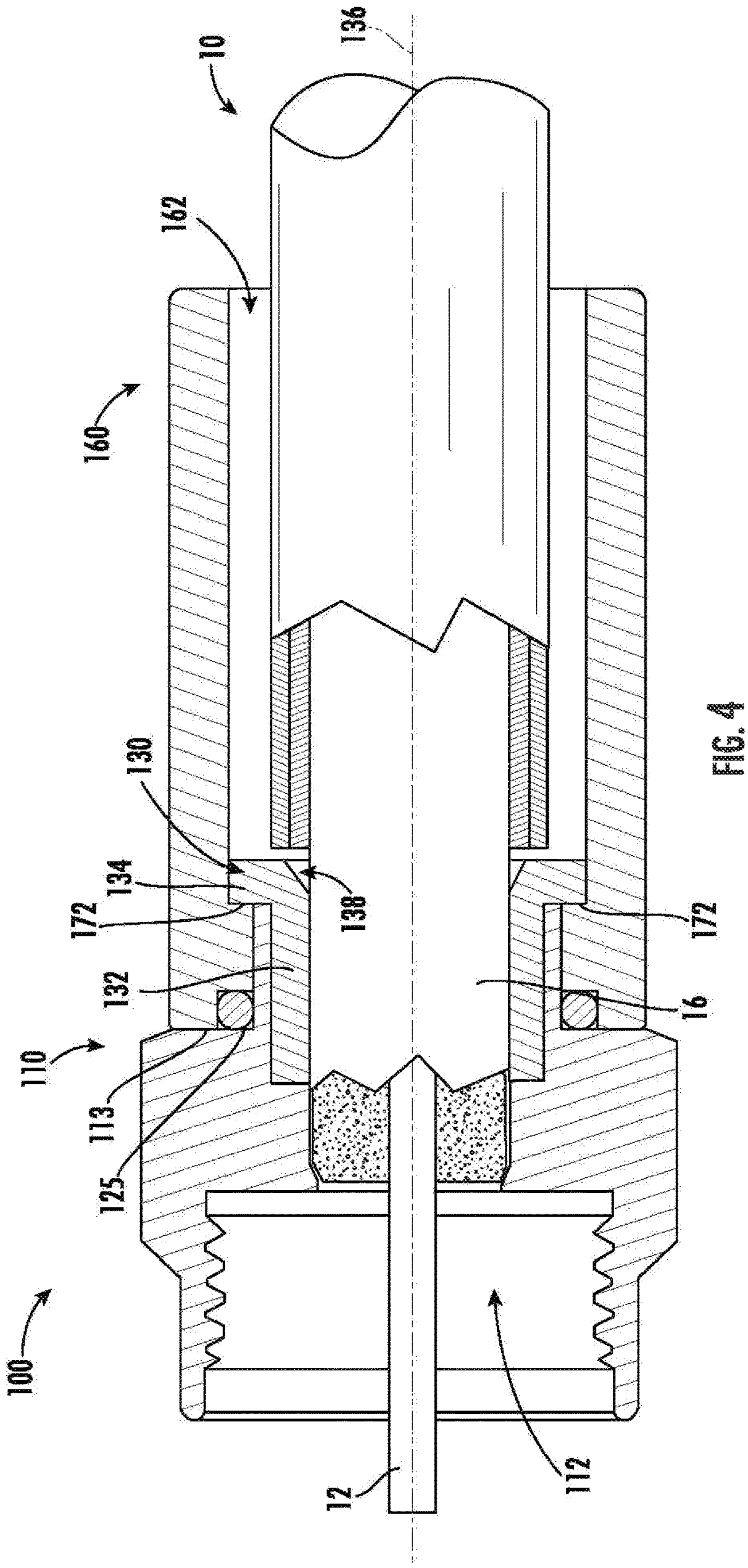
FIG. 4 schematically depicts a section view of a coaxial cable connector assembly including a retainer, according to one or more embodiments shown and described herein.

Referring to FIGS. 1A, 1B, and 4 in some embodiments, the coaxial cable connector assembly 100 includes a retainer 130 engaged with the coupler 110 and the rear body 160, and generally couples the coupler 110 to the rear body 160. In embodiments, the retainer 130 generally defines a tube portion 132 coaxial with the inner channel 112 of the coupler 110, and a flange 134 that extends outwardly from the tube portion 132 that is engaged with the rear body 160. For example, in some embodiments, the rear body 160 defines a cable channel 162 extending through the rear body 160 and the coaxial cable 10 is insertable through the cable channel 162 of the rear body 160. In the embodiment depicted in FIG. 4, the rear body 160 defines an annular ridge 172 that extends inwardly along the cable channel 162. And the flange 134 of the retainer 130 engages the annular ridge 172 of the rear body 160, thereby restricting axial movement of the rear body 160 with respect to the retainer 130.

In some embodiments, the tube portion 132 of the retainer 130 is engaged with the coupler 110, and some embodiments, the tube portion 132 of the retainer 130 is coupled to the coupler 110. In embodiments, the tube portion 132 of the retainer 130 may be coupled to the coupler 110 in any suitable fashion, for example and without limitation, the retainer 130 may be coupled to the coupler 110 via a press-fit interference, the retainer 130 may be coupled to the coupler 110 via structural adhesives, or the like.

In some embodiments, the coupler 110 defines a rear body face 113 oriented rearwardly towards the rear body 160. In embodiments, when the coaxial cable connector assembly 100 is assembled, the rear body 160 may be captured between the rear body face 113 of the coupler 110 and the flange 134 of the retainer 130, thereby restricting axial movement between the coupler 110 and the rear body 160. In some embodiments, the coaxial cable connector assembly 100 may include a sealing element 125 positioned between the coupler 110 and the rear body 160, such as an o-ring or the like. In embodiments, the sealing element 125 may restrict environmental elements, such as moisture or the like from reaching the inner channel 112 of the coupler 110.

Referring to FIGS. 1A, 1B, and as best shown in FIG. 4, in some embodiments, the retainer 130 defines an annular bevel 138 positioned between the flange 134 and the tube portion 132. In embodiments, the annular bevel 138 is oriented inwardly toward a longitudinal axis 136 extending through the coupler 110, and generally allows the flange 134 to deform inwardly without the retainer 130 damaging the outer conductor 16. For example, in some embodiments, the flange 134 of the retainer 130 may be inwardly deformed such that the rear body 160 may be slid over the flange 134 of the retainer 130 to couple the rear body 160 to the coupler 110. The annular bevel 138 may limit impingement of the flange 134 against the outer conductor 16 as the flange 134 of the retainer 130 deforms inwardly, thereby reducing contact and/or damage of the outer conductor 16 as the rear body 160 is coupled to the coupler 110.

Figure 1C:
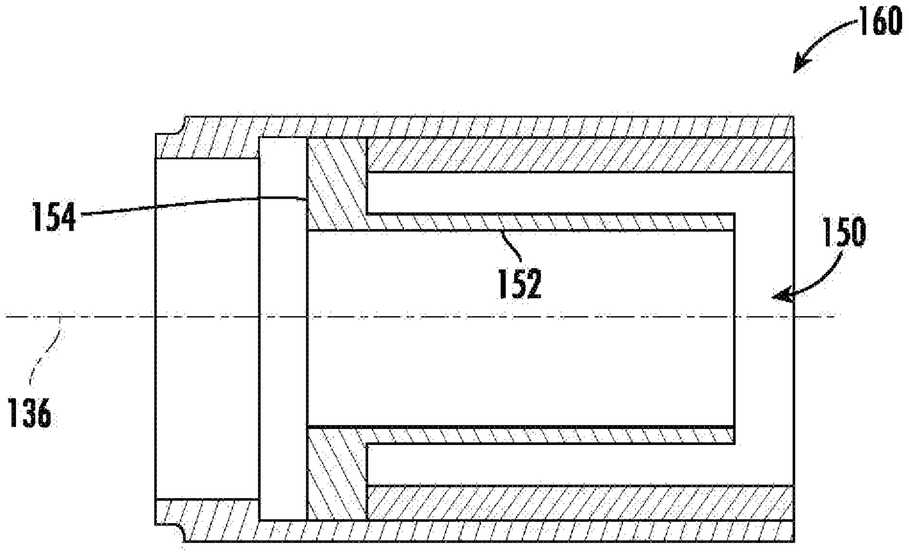
FIG. 1C schematically depicts a rear body of the coaxial cable connector assembly of FIG. 1A, according to one or more embodiments shown and described herein.

In the embodiment depicted in FIGS. 1A and 1C, the coaxial cable connector assembly 100 includes a post 150 extending at least partially along the cable channel 162. In embodiments, the post 150 generally defines a post body 152 that extends along the cable channel 162, and a post flange 154 that extends outwardly from the post body 152. In embodiments, the post body 152 is structurally configured to be inserted between the outer braid 18 (FIG. 2) and the outer conductor 16 (FIG. 2) of the coaxial cable 10 (FIG. 2). In the embodiment depicted in FIG. 1A, the post flange 154 abuts the retainer 130 along the longitudinal axis 136 extending between the front portion 114 and the rear portion 116 of the coupler 110. In some embodiments, the coaxial cable connector assembly 100 does not include the post 150.

Figure 5:
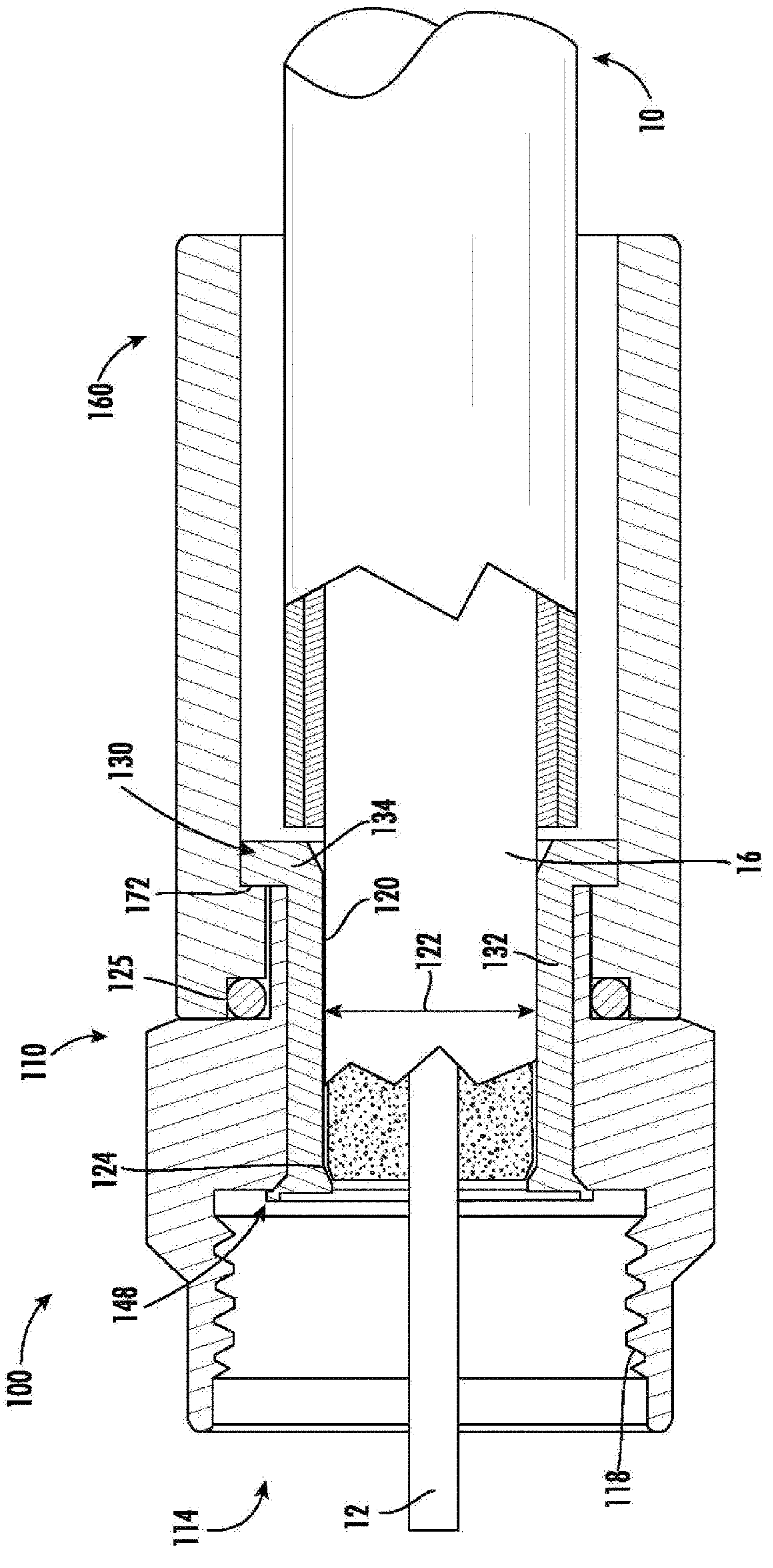
FIG. 5 schematically depicts a section view of another coaxial cable connector assembly including a retainer engaged with an outer conductor of a coaxial cable, according to one or more embodiments shown and described herein.

Referring to FIG. 5 a section view of another embodiment of the coaxial cable connector assembly 100 is schematically depicted. In the embodiment depicted in FIG. 5, the coaxial cable connector assembly 100 includes the coupler 110, the rear body 160, and the retainer 130 engaged with the coupler 110 and the rear body 160. However, in the embodiment depicted in FIG. 5, the retainer 130 comprises the outer conductor engagement portion 124. In particular, in the embodiment depicted in FIG. 5, the retainer 130 defines the nominal portion 120 defining the nominal inner span 122, and the outer conductor engagement portion 124 of the retainer 130 tapers inwardly from the nominal portion 120 moving forward along the inner channel 112 to the front portion 114 of the coupler 110. Similar to the embodiments described above, the outer conductor engagement portion 124 is structurally engaged to contact the outer conductor 16 of the coaxial cable 10. Through contact between the outer conductor 16 and the retainer 130, and through contact between the retainer 130 and the coupler 110, the coaxial cable connector assembly 100 forms an electrical pathway between the thread 118 of the coupler 110 and the outer conductor 16 of the coaxial cable 10.

In the embodiment depicted in FIG. 5, the retainer 130 further includes a forward flange 148 that is engaged with the coupler 110 and oriented to face forward from the front portion 114 of the coupler 110. In embodiments, the forward flange 148 engages the coupler 110 and may restrict axial movement of the coupler 110 with respect to the retainer 130.

Figure 6:
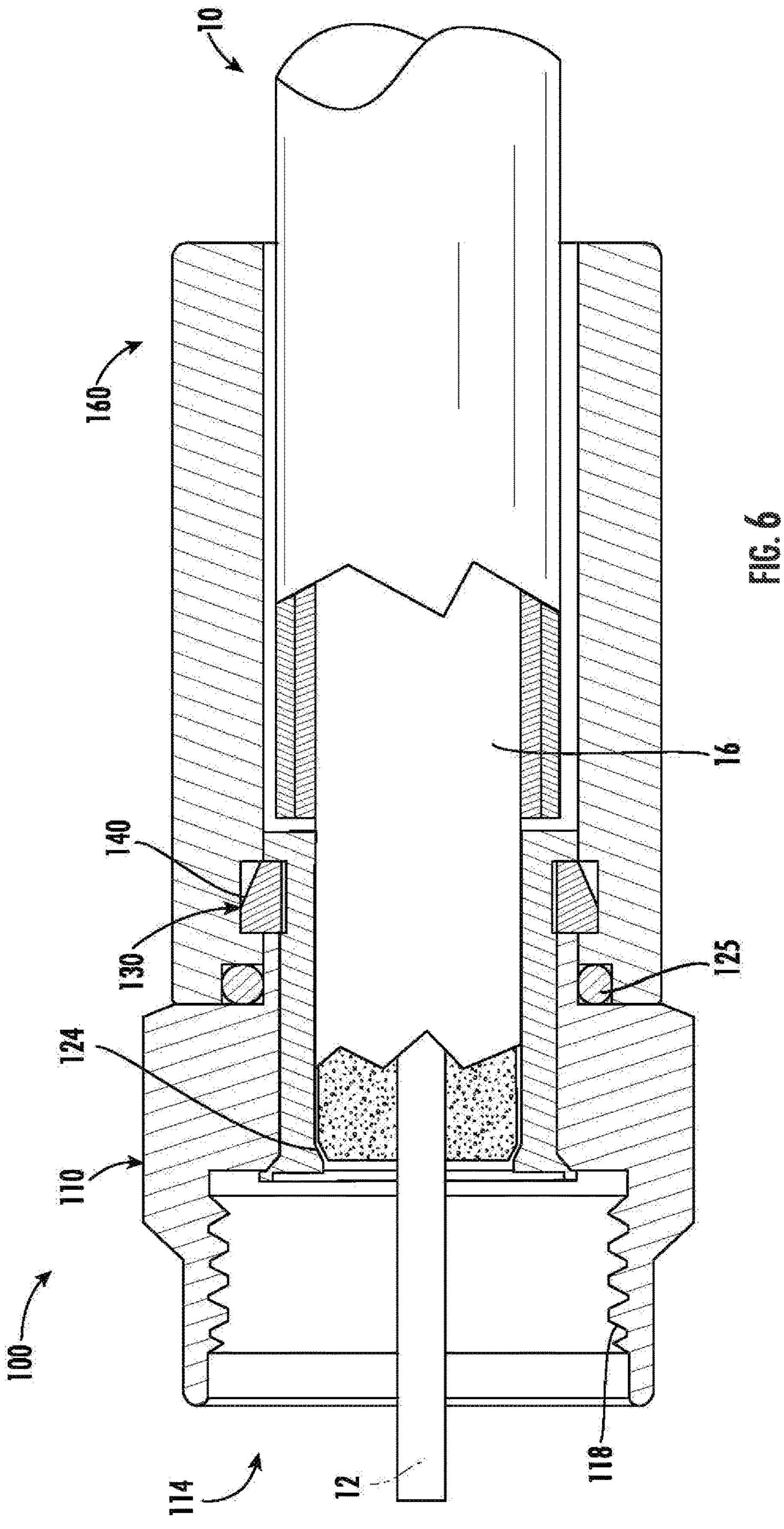
FIG. 6 schematically depicts a section view of another coaxial cable connector assembly including a retainer comprising a retaining ring, according to one or more embodiments shown and described herein.

Referring to FIG. 6, a section view of another embodiment of the coaxial cable connector assembly 100 is schematically depicted. Similar to the embodiments described above, the coaxial cable connector assembly 100 includes the coupler 110 and the rear body 160. Further, similar to the embodiment described above, in the embodiment depicted in FIG. 6, the coupler 110 is coupled to the rear body 160 by the retainer 130. However, in the embodiment depicted in FIG. 6, the retainer 130 comprises an annular retaining ring 140 that extends around the coupler 110. In embodiments, the annular retaining ring 140 is engaged with the rear body 160 and the coupler 110 and couples the rear body 160 to the coupler 110. In particular, in embodiments, the annular retaining ring 140 couples the rear body 160 to the coupler 110 such that the coupler 110 is rotatable with respect to the rear body 160.

Figure 7:
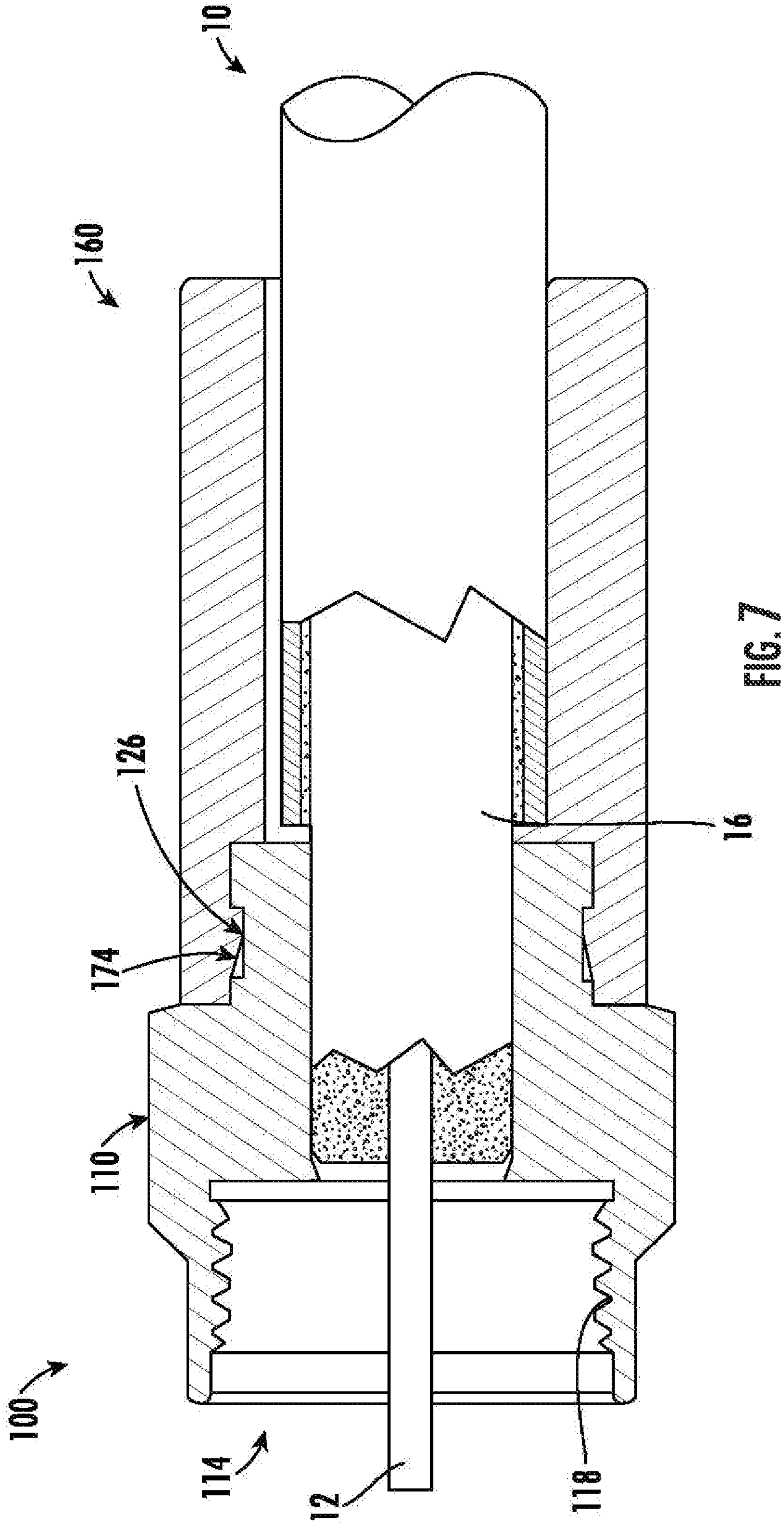
FIG. 7 schematically depicts a section view of another coaxial cable connector assembly with the coupler engaged with the rear body, according to one or more embodiments shown and described herein.

Referring to FIG. 7, a section view of another embodiment of the coaxial cable connector assembly 100 is schematically depicted. Similar to the embodiments described above, the coaxial cable connector assembly 100 includes the coupler 110 and the rear body 160. However, in the embodiment depicted in FIG. 7, the coupler 110 and the rear body 160 are directly engaged with one another and the coaxial cable connector assembly 100 does not include a retainer 130 (FIG. 6). In particular, in the embodiment depicted in FIG. 7, the coupler 110 defines a body engagement feature 126 that is engaged with and retains a coupler engagement feature 174 of the rear body 160. In the embodiment depicted in FIG. 7, the body engagement feature 126 generally defines a recess extending into the coupler 110 and the coupler engagement feature 174 generally defines a protrusion extending outwardly from the rear body 160. While in the embodiment depicted in FIG. 7, the body engagement feature 126 defines a recess and the coupler engagement feature 174 defines a protrusion, it should be understood that the coupler engagement feature 174 of the rear body 160 and the body engagement feature 126 of the coupler 110 may include any suitable complementary features that engage with one another to couple the coupler 110 to the rear body 160. For example, in some embodiments, the body engagement feature 126 of the coupler 110 may include a protrusion and the coupler engagement feature 174 of the rear body 160 may include a recess.

Figure 8:
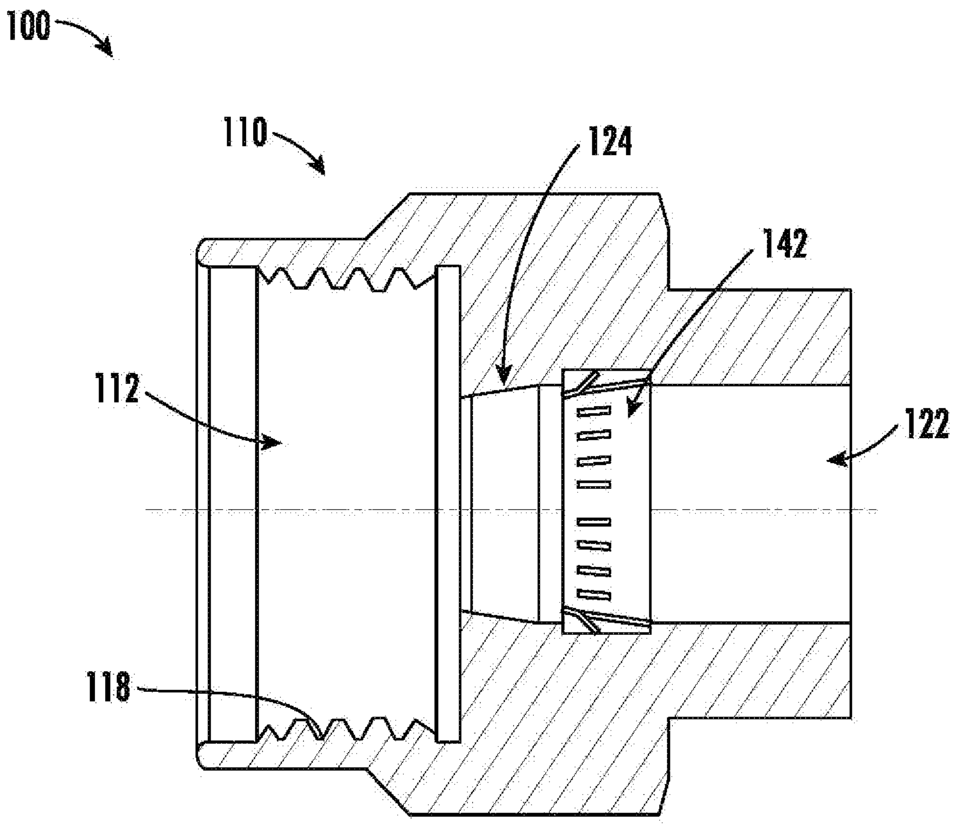
FIG. 8 schematically depicts a section view of a coupler of a coaxial cable connector assembly including a contact ring, according to one or more embodiments shown and described herein.

Referring to FIG. 8, another embodiment of the coupler 110 is schematically depicted. In some embodiments, the coaxial cable connector assembly 100 further includes a contact ring 142 positioned on the inner channel 112 of the coupler 110. In embodiments, the contact ring 142 may be formed of a conductive material, such as copper, aluminum, or the like. The contact ring 142 is structurally configured to engage the outer conductor 16 (FIG. 2) of the coaxial cable 10 (FIG. 2). In embodiments, the contact ring 142 may be in contact with the outer conductor 16 (FIG. 2) of the coaxial cable 10 (FIG. 2) and the coupler 110, and the contact ring 142 may assist in electrically coupling the thread 118 of the coupler 110 with the outer conductor 16 (FIG. 2).

Figure 9:
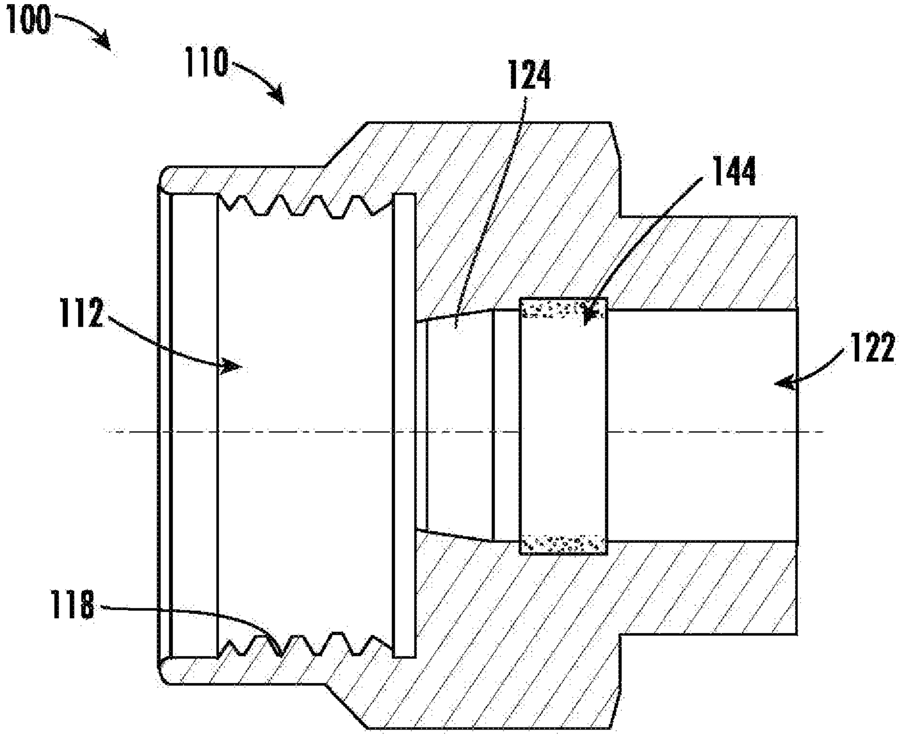
FIG. 9 schematically depicts a section view of another coupler of a coaxial cable connector assembly including a conductive gasket, according to one or more embodiments shown and described herein.

Referring to FIG. 9, another embodiment of the coupler 110 is schematically depicted. In some embodiments, the coaxial cable connector assembly 100 further includes a conductive gasket 144 positioned on the inner channel 112 of the coupler 110. In embodiments, the conductive gasket 144 may be formed of a conductive material, such as copper or the like. The conductive gasket 144 is structurally configured to engage the outer conductor 16 (FIG. 2) of the coaxial cable 10 (FIG. 2). In embodiments, the conductive gasket 144 may be in contact with the outer conductor 16 (FIG. 2) of the coaxial cable 10 (FIG. 2) and the coupler 110, and the conductive gasket 144 may assist in electrically coupling the thread 118 of the coupler 110 with the outer conductor 16 (FIG. 2).

Figure 10:
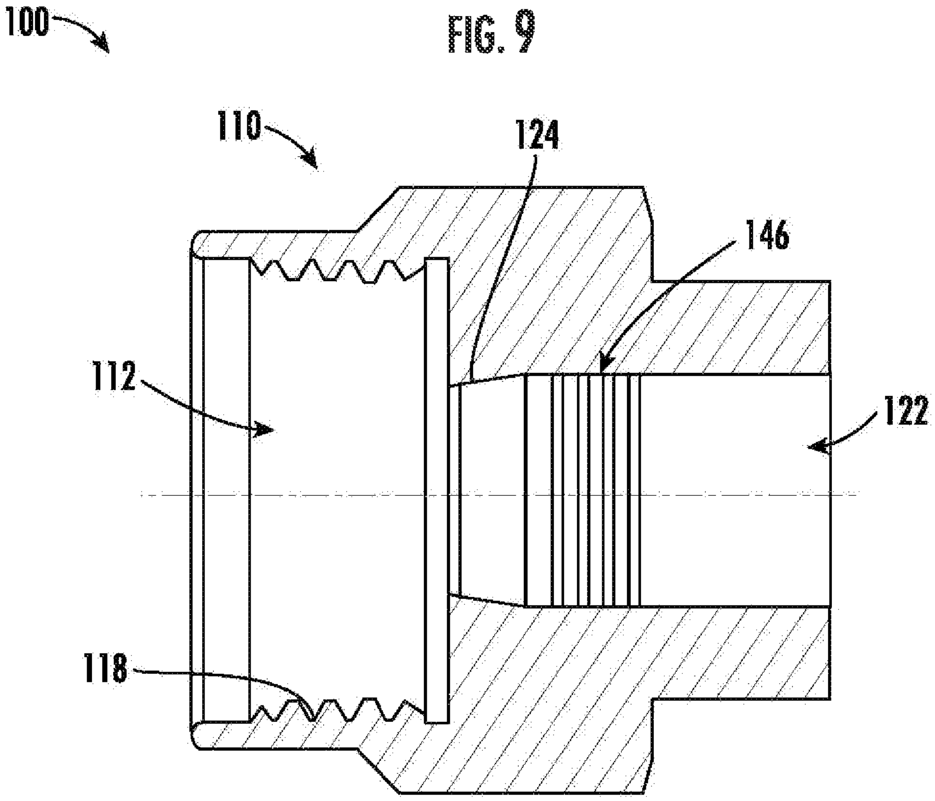
FIG. 10 schematically depicts a section view of another coupler of a coaxial cable connector assembly including one or more barbs, according to one or more embodiments shown an described herein.

Referring to FIG. 10, another embodiment of the coupler 110 is schematically depicted. In some embodiments, coupler 110 defines one or more barbs 146 extending inwardly from the nominal portion 120 of the coupler 110. The one or more barbs 146 are structurally configured to engage the outer conductor 16 (FIG. 2) of the coaxial cable 10 (FIG. 2). In embodiments, the one or more barbs 146 may be in contact with the outer conductor 16 (FIG. 2) of the coaxial cable 10 (FIG. 2) and may assist in electrically coupling the thread 118 of the coupler 110 with the outer conductor 16 (FIG. 2).

Figure 11:
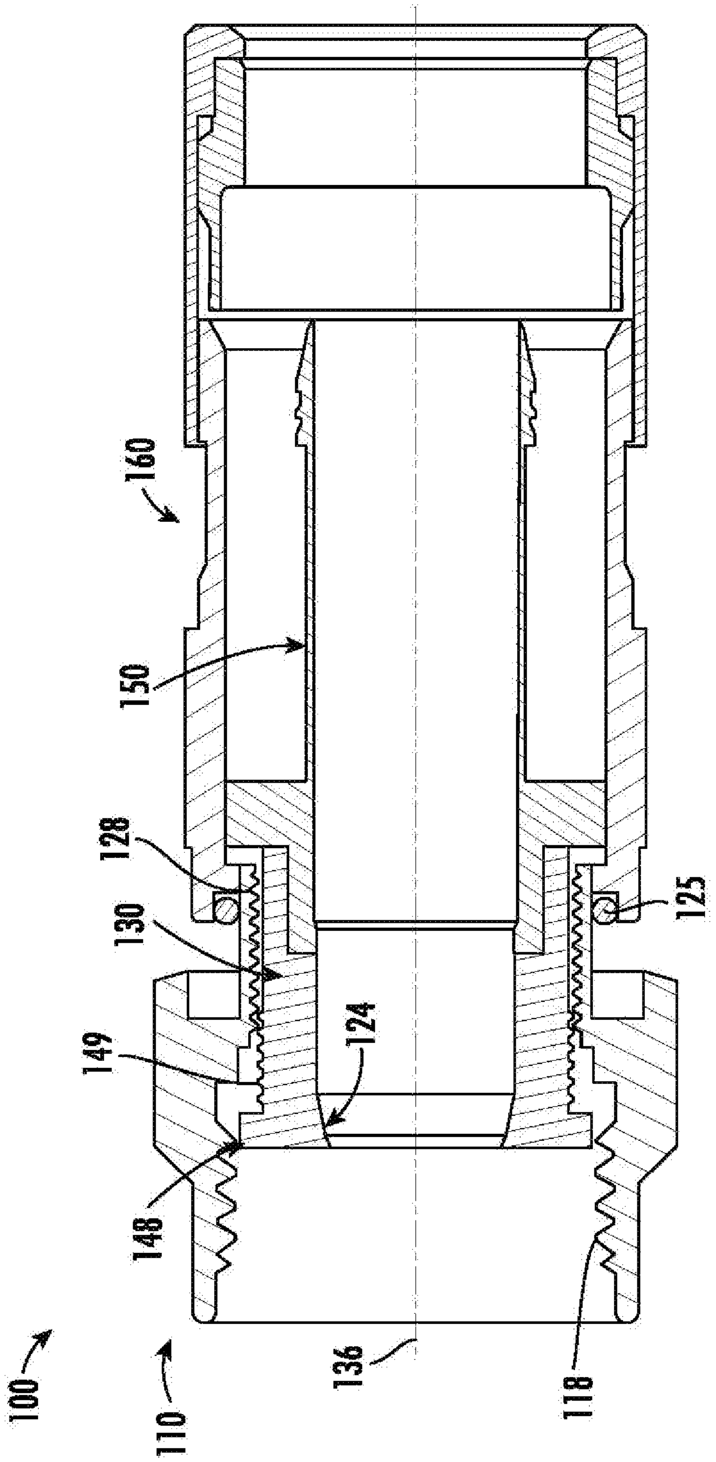
FIG. 11 schematically depicts a section view of another coaxial cable connector assembly including a threaded retainer, according to one or more embodiments shown and described herein.

Referring to FIG. 11, another embodiment of the coaxial cable connector assembly 100 is schematically depicted. Similar to the embodiments described above, the coaxial cable connector assembly 100 includes the coupler 110 rotatably engaged with and positioned forward of the rear body 160. Further, in the embodiment depicted in FIG. 11, the coaxial cable connector assembly 100 includes the retainer 130, and the retainer 130 defines the outer conductor engagement portion 124. In the embodiment depicted in FIG. 11, the retainer 130 further includes the forward flange 148 that restricts axial movement of the retainer 130 with respect to the coupler 110. However, the coupler 110 defines a retainer engaging thread 128 and the retainer 130 defines a coupler engaging thread 149 engaged with the retainer engaging thread 128 of the coupler 110. Through engagement between the coupler engaging thread 149 of the retainer 130 and the retainer engaging thread 128 of the coupler 110, the retainer 130 is movable with respect to the coupler 110 along the longitudinal axis 136. In particular, as the coupler 110 rotates with respect to the retainer 130, engagement between the coupler engaging thread 149 of the retainer 130 and the retainer engaging thread 128 of the coupler 110 causes the retainer 130 to move along the longitudinal axis 136. When the coupler 110 is engaged with a port of a device, a user such as a technician may rotate the coupler 110 to attach the threads 118 of the coupler 110 with corresponding threads of the port of the device. By rotating the coupler 110, the retainer 130 is moved along the longitudinal axis 136. More particularly, rotation of the coupler 110 causes the retainer 130 to move forward along the longitudinal axis 136. By moving the retainer 130 forward along the longitudinal axis 136, the retainer 130 may be moved into engagement with the port of the device. For example, as the coupler 110 is rotated, the coupler 110 is drawn forward into the port of the device, and the rotation of the coupler 110 further causes the retainer 130 to move forward along the longitudinal axis 136, causing the retainer 130 to engage the port of the device. By moving the retainer 130 forward as the coupler 110 rotates, the retainer 130 may engage the port of the device with fewer rotations of the coupler 110 as compared to compared to configurations in which the retainer 130 does not move with respect to the coupler 110. In this way, a user such as a technician may establish electrical connection between the retainer 130 and the port of the device, and accordingly between the port of the device and the outer conductor 16 (FIG. 2) of the coaxial cable 10 (FIG. 2) with less manipulation of the coupler 110, thereby simplifying the installation process.

Figure 12:
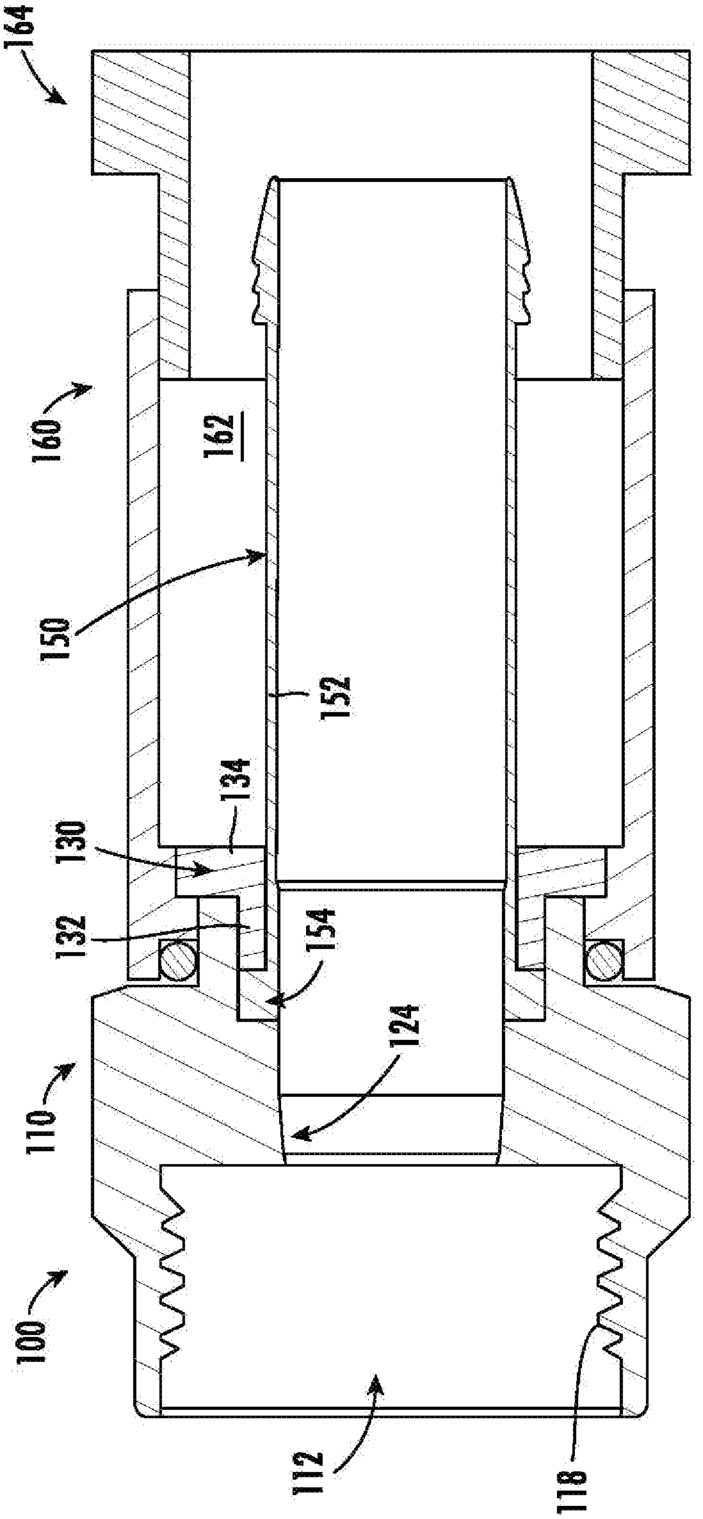
FIG. 12 schematically depicts a section view of another coaxial cable connector assembly including an annular press-ring, according to one or more embodiments shown and described herein.

Referring to FIG. 12, another embodiment of the coaxial cable connector assembly 100 is schematically depicted. Similar to the embodiments described above, the coaxial cable connector assembly 100 includes the coupler 110 rotatably engaged with and positioned forward of the rear body 160. The coaxial cable connector assembly 100 further includes the post 150 defining the post body 152 and the post flange 154. However, in the embodiment depicted in FIG. 12, the post flange 154 engages the tube portion 132 of the retainer 130, thereby restricting movement of the post 150 with respect to the retainer 130, and accordingly the coupler 110.

Further, in the embodiment depicted in FIG. 12, the coaxial cable connector assembly 100 includes annular press-ring 164 selectively insertable within the cable channel 162 to couple the coaxial cable 10 (FIG. 2) to the rear body 160. In particular, the annular press-ring 164 may generally reduce the inner span of the cable channel 162 of the rear body 160 and may be compressed between the coaxial cable 10 (FIG. 2) and the rear body 160, thereby coupling the coaxial cable 10 (FIG. 2) to the rear body 160 and accordingly the coaxial cable connector assembly 100.

Figure 13A:
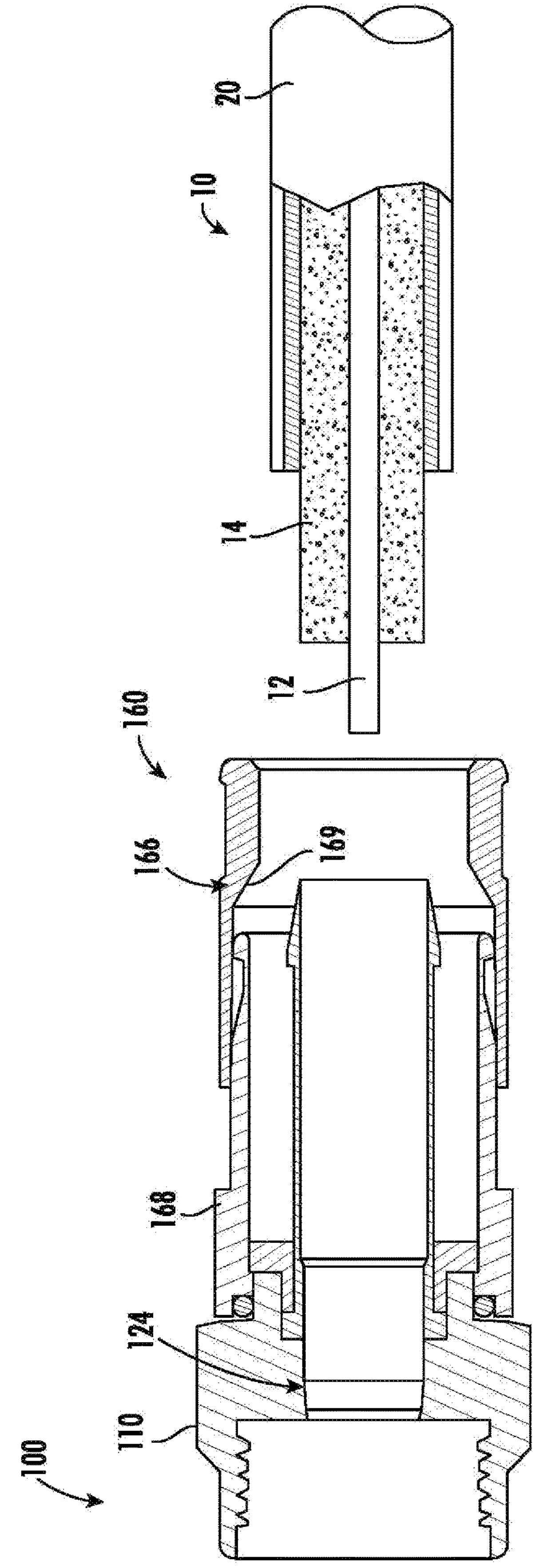
FIG. 13A schematically depicts a section view of another coaxial cable connector assembly including a rear body with an outer body member and an inner body member, according to one or more embodiments shown and described herein.
Figure 13B:
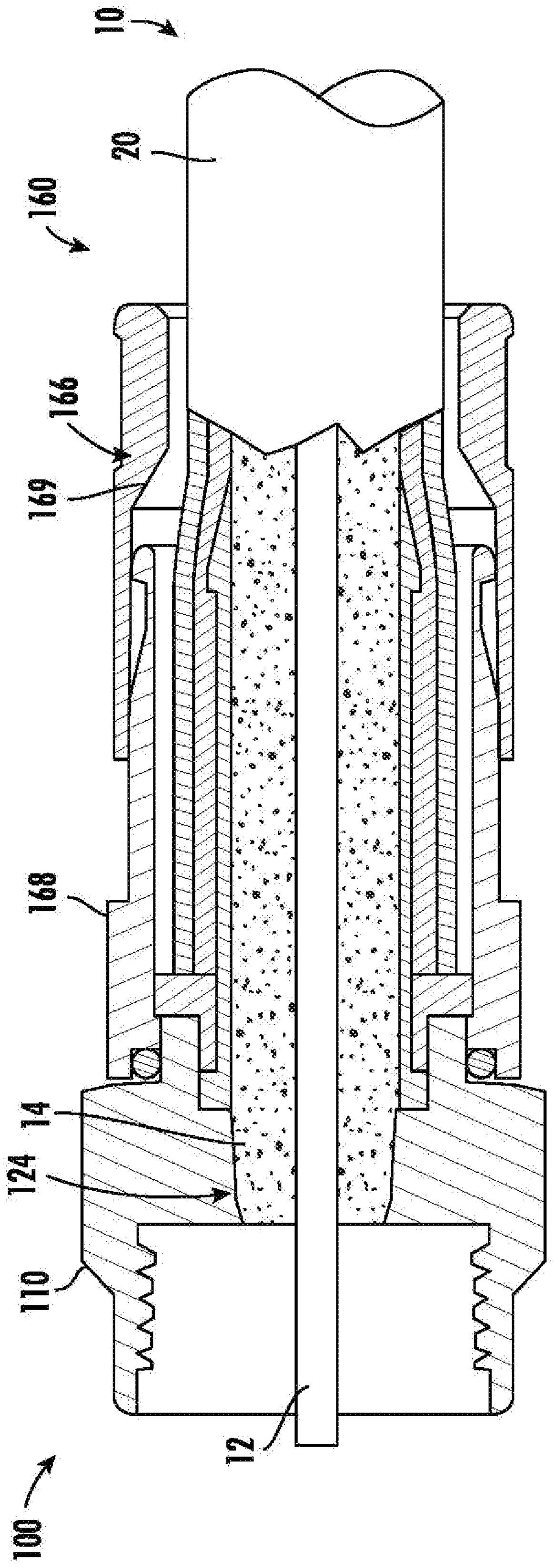
FIG. 13B schematically depicts a section view of the coaxial cable connector assembly of FIG. 13A with a coaxial cable inserted into the coaxial cable connector assembly, according to one or more embodiments shown and described herein.
Figure 13C:
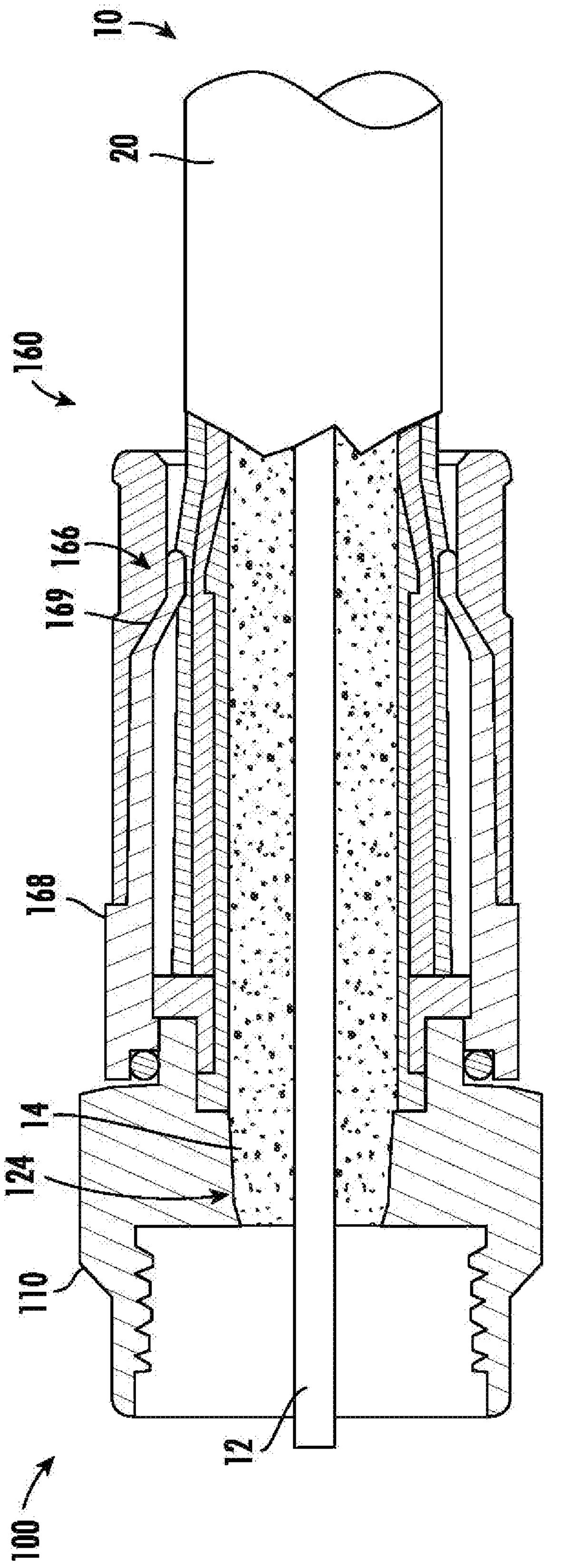
FIG. 13C schematically depicts a section view of the coaxial cable connector assembly of FIG. 13A with the rear body positioned in an engaged position, according to one or more embodiments shown and described herein.

Referring to FIGS. 13A-13C, another embodiment of the coaxial cable connector assembly 100 is schematically depicted. In the embodiment depicted in FIGS. 13A-13C, the coaxial cable connector assembly 100 includes the coupler 110 and the rear body 160. However, in the embodiment depicted in FIGS. 13A-13C, the rear body 160 comprises outer body member 166 and an inner body member 168 positioned inwardly from the outer body member 166. In embodiments, the rear body 160 is positionable in a disengaged position, as shown in FIGS. 13A and 13B, in which the outer body member 166 is spaced apart from the inner body member 168, and an engaged position as shown in FIG. 13C, in which a taper 169 of the outer body member 166 is engaged with the inner body member 168 and inwardly deforms at least a portion of the inner body member 168.

In particular, FIGS. 13A-13C depict different positions of the rear body 160 during an installation process. As shown in FIG. 13A, the coaxial cable 10 may initially be positioned rearward of the rear body 160, and as shown in FIG. 13B, the coaxial cable 10 may be inserted into the rear end of the rear body 160. With the coaxial cable 10 fully inserted into the rear body 160, the outer conductor 16 of the coaxial cable 10 is engaged with the outer conductor engagement portion 124 of the coupler 110.

With the coaxial cable 10 fully inserted into the rear body 160 of the coaxial cable connector assembly 100, the outer body member 166 is moved forward over the inner body member 168, for example by a technician. As the outer body member 166 moves forward over the inner body member 168, the taper 169 of the outer body member 166 engages the inner body member 168, and deforms the inner body member 168 inwardly toward the coaxial cable 10. In embodiments, the inner body member 168 may engage the outer jacket 20 of the coaxial cable 10, thereby coupling the rear body 160, and accordingly the coaxial cable connector assembly 100 to the coaxial cable 10.

Figure 14:
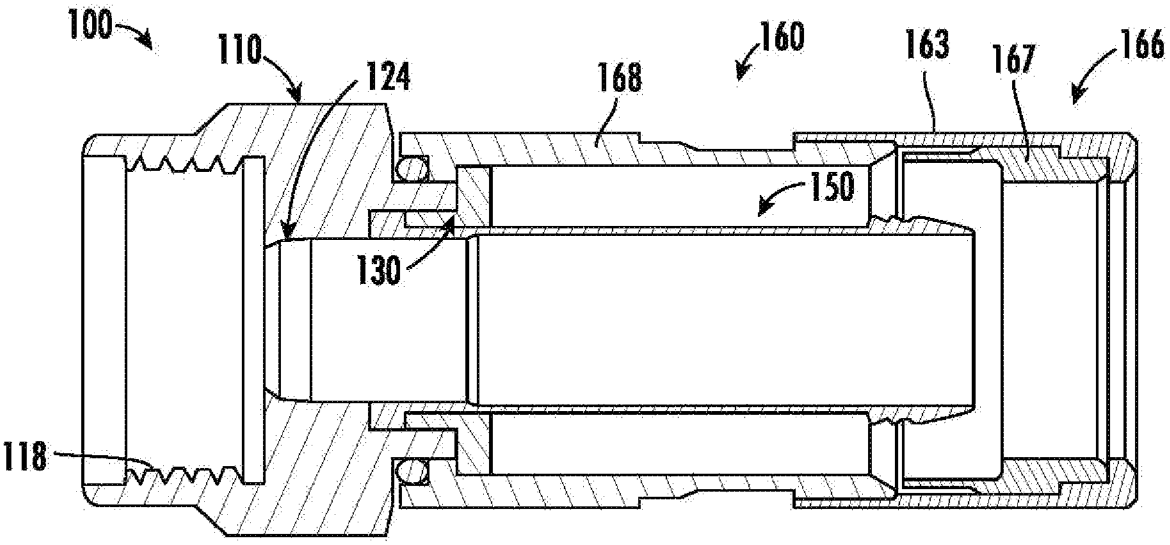
FIG. 14 schematically depicts a section view of another coaxial cable connector assembly including a rear body with an outer body member and an inner body member, according to one or more embodiments shown and described herein.

Referring to FIG. 14, another embodiment of the coaxial cable connector assembly 100 is schematically depicted. Similar to the embodiment described above and depicted in FIGS. 13A-13C, in the embodiment depicted in FIG. 14, the rear body 160 includes the inner body member 168 and the outer body member 166. However, in the embodiment depicted in FIG. 14, the outer body member 166 includes an outer portion 163 structurally configured to slide over the inner body member 168, and an inner portion 167 structurally configured to slide inside the inner body member 168. In embodiments, when the rear body 160 is in the engaged position, the inner portion 167 is inwardly deformed. In particular, as the outer body member 166 moves forward, the inner portion 167 of the outer body member 166 engages the inner body member 168 and deforms inwardly. By deforming inwardly, the inner portion 167 of the outer body member 166 may engage the outer jacket 20 (FIG. 2) of the coaxial cable 10 (FIG. 2), thereby coupling the coaxial cable 10 (FIG. 2) to the rear body 160 and accordingly to the coaxial cable connector assembly 100.

Figure 15:
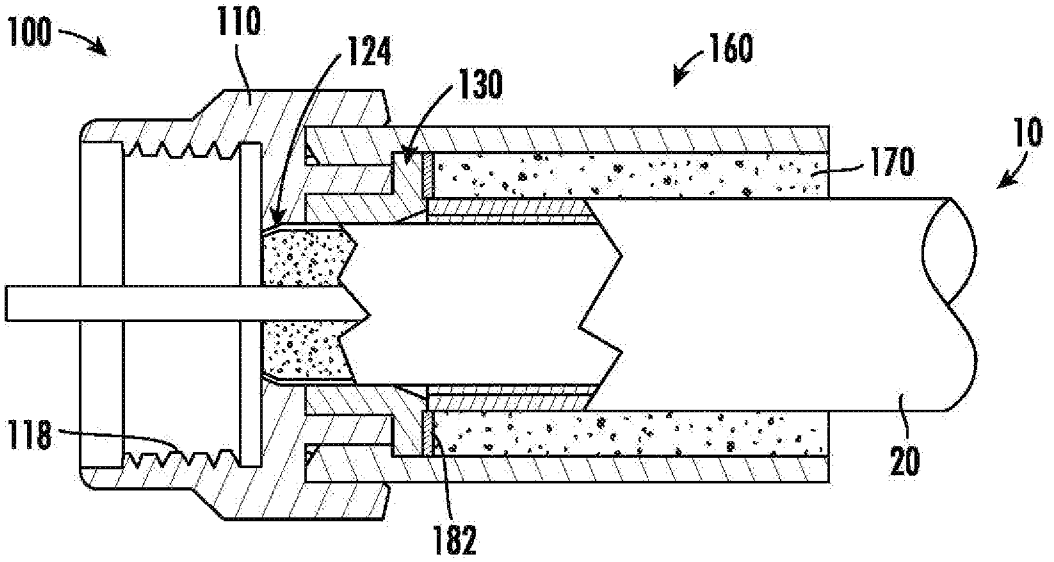
FIG. 15 schematically depicts a section view of another coaxial cable connector assembly coupled to a coaxial cable with adhesive, according to one or more embodiments shown and described herein.

Referring to FIG. 15, in some embodiments, the coaxial cable connector assembly 100 includes an adhesive 170 that couples the coaxial cable 10 to the rear body 160. In some embodiments, the coaxial cable connector assembly 100 includes an annular dam 182 that separates the adhesive 170 from the retainer 130, such that the retainer 130 may rotate with respect to the rear body 160. In embodiments, the adhesive 170 may include any adhesive suitable to couple the outer jacket 20 of the coaxial cable 10 to the rear body 160, and may include a single component adhesive, an epoxy and hardener, or the like.

Figure 16:
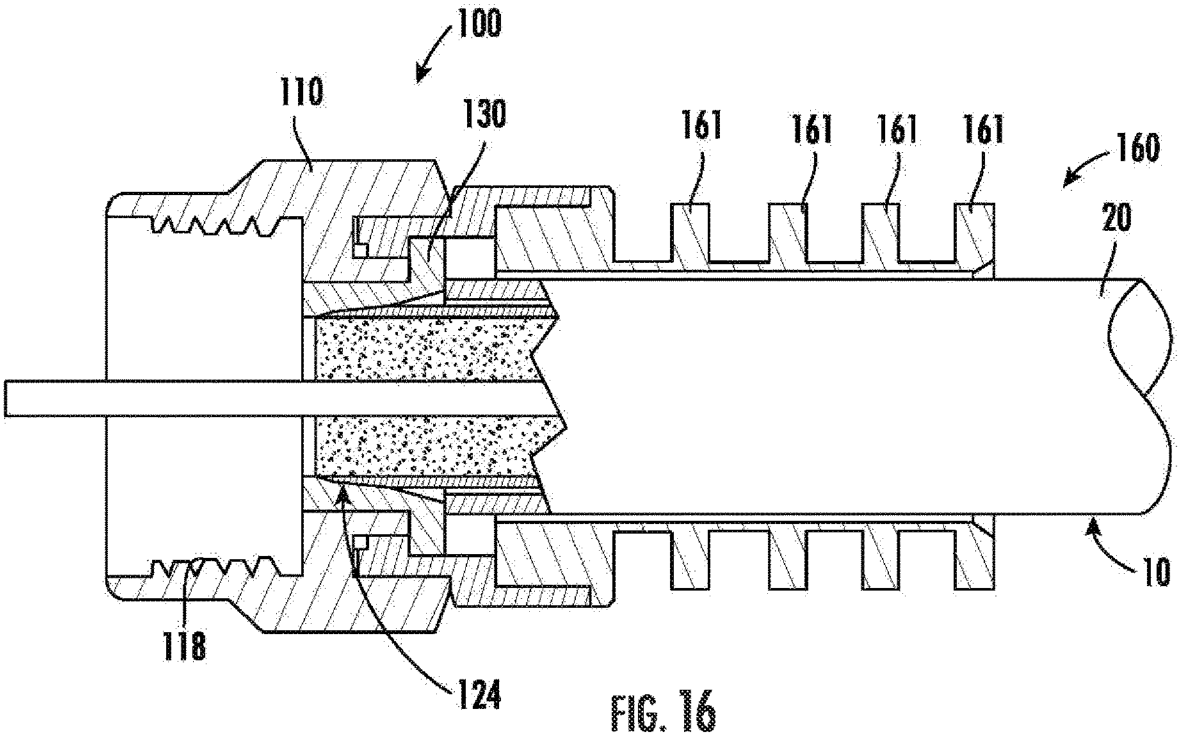
FIG. 16 schematically depicts a section view of another coaxial cable connector assembly including a rear body having one or more crimp members, according to one or more embodiments shown and described herein.

Referring to FIG. 16, another embodiment of the coaxial cable connector assembly 100 is schematically depicted. In the embodiment depicted in FIG. 16, the rear body 160 defines one or more crimp members 161 extending outwardly from the rear body 160, wherein the one or more crimp members 161 are structurally configured to plastically deform inwardly to couple the coaxial cable 10 to the rear body 160. In particular, a user, such as a technician, may utilize a tool such as pliers, to compress and deform the one or more crimp members 161 inwardly such that the rear body 160 engages the outer jacket 20 of the coaxial cable 10, thereby coupling the coaxial cable 10 to the rear body 160 and accordingly the coaxial cable connector assembly 100.

Figure 17:
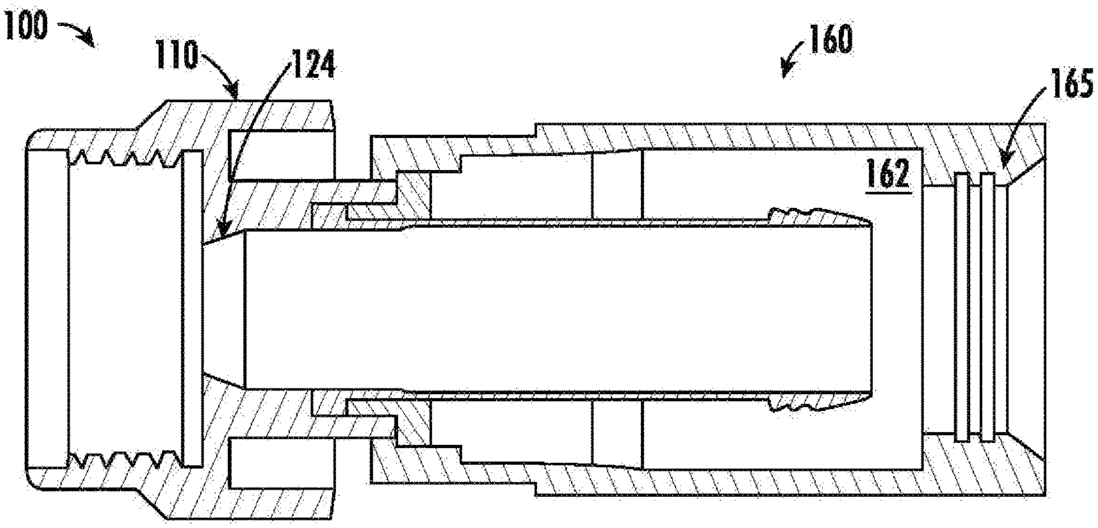
FIG. 17 schematically depicts a section view of another coaxial cable connector assembly including a rear body with one or more recesses, according to one or more embodiments shown and described herein.

Referring to FIG. 17, another embodiment of the coaxial cable connector assembly 100 is schematically depicted. In the embodiment depicted in FIG. 17, the rear body 160 defines one or more recesses 165 that are structurally configured to engage the outer jacket 20 (FIG. 2) of the coaxial cable 10 (FIG. 2). By engaging the outer jacket 20 (FIG. 2) of the coaxial cable 10 (FIG. 2) the one or more recesses 165 of the rear body 160 may couple the coaxial cable 10 (FIG. 2) to the rear body 160, and accordingly to the coaxial cable connector assembly 100. Further, the cable channel 162 of the rear body 160 may inwardly taper moving forward along the rear body 160, engaging the outer jacket 20 (FIG. 2) of the coaxial cable 10 (FIG. 2) to couple the coaxial cable 10 (FIG. 2) to the rear body 160.

Figure 18:
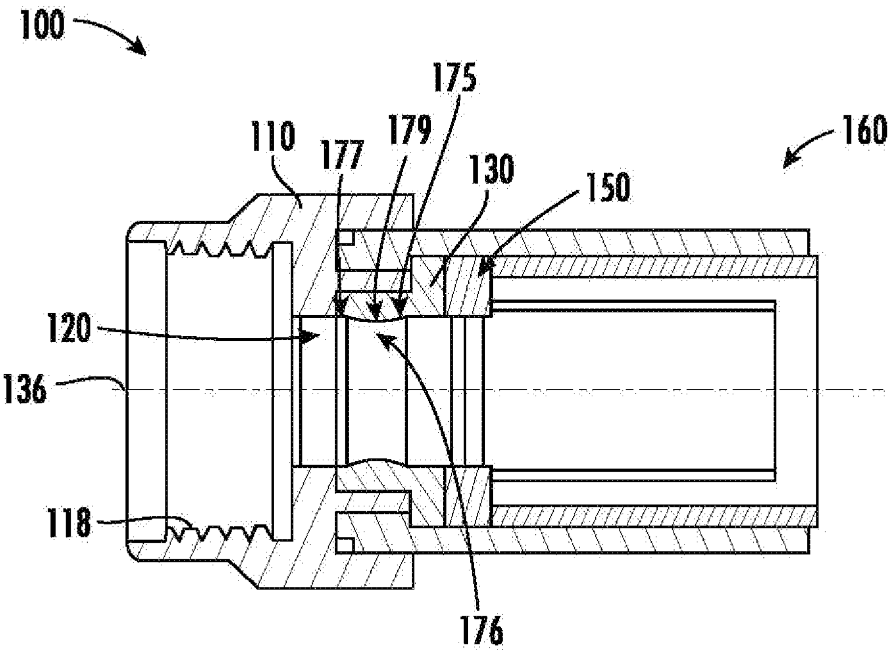
FIG. 18 schematically depicts a section view of another coaxial cable connector assembly including a radial bulge, according to one or more embodiments shown and described herein.

Referring to FIG. 18, another embodiment of the coaxial cable connector assembly 100 is schematically depicted. In the embodiment depicted in FIG. 18, the retainer 130 defines a radial bulge 176 extending inwardly from the nominal portion 120 of the coupler 110. In the embodiment depicted in FIG. 18, the retainer 130 defines the radial bulge 176, however, it should be understood that this is merely an example. For example, in some embodiments, the coupler 110 may define the radial bulge 176. In the embodiment depicted in FIG. 18, the radial bulge 176 defines a rearward portion 175 and a forward portion 177 spaced apart from the rearward portion 175 in an axial direction, and a crest 179 that extends inwardly from the rearward portion 175 and the forward portion 177 in a radial direction. In embodiments, the radial bulge 176 is structurally configured to engage the outer conductor 16 (FIG. 2) and/or the outer braid 18 (FIG. 2) of the coaxial cable 10 (FIG. 2). By engaging the outer conductor 16 (FIG. 2) and/or the outer braid 18 (FIG. 2) of the coaxial cable 10 (FIG. 7), the radial bulge 176 forms an electrical pathway between the thread 118 of the coupler 110 and the outer conductor 16 (FIG. 2). For example, in the embodiment depicted in FIG. 18, the retainer 130 defines the radial bulge 176, and the retainer 130 contacts the coupler 110, such that through engagement with the radial bulge 176, the outer conductor 16 (FIG. 2) of the coaxial cable 10 (FIG. 2) is electrically coupled to the threads 118 of the coupler 110 through the retainer 130 and the coupler 110.

Figure 19:
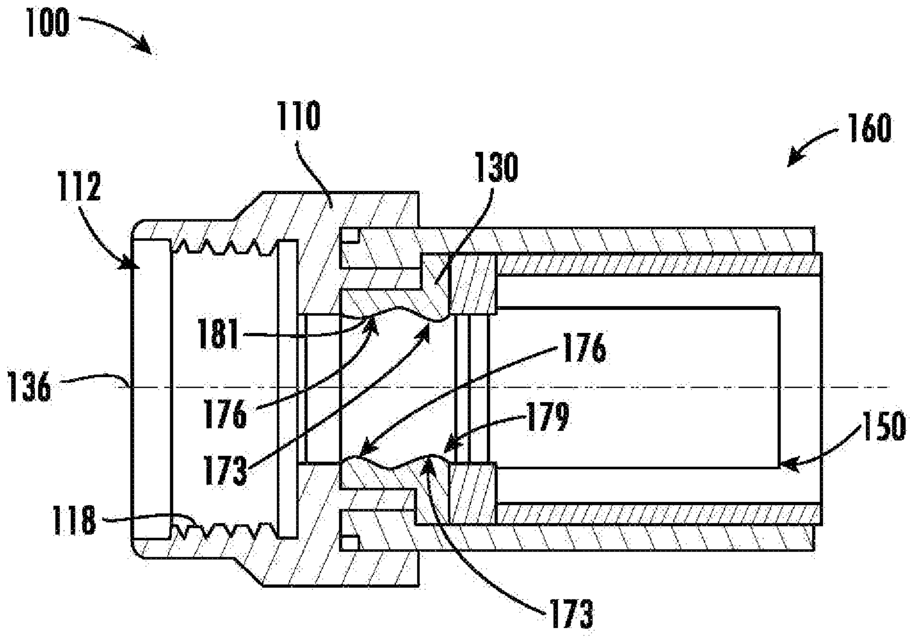
FIG. 19 schematically depicts a section view of another coaxial cable connector assembly including a pair of radial bulges, according to one or more embodiments shown and described herein.

Referring to FIG. 19, another embodiment of the coaxial cable connector assembly 100 is schematically depicted. In the embodiment depicted in FIG. 19, the radial bulge 176 is a first radial bulge 176, and the coaxial cable connector assembly 100 further comprises a second radial bulge 173 spaced apart from the first radial bulge 176. As shown in FIG. 19, the first radial bulge 176 and the second radial bulge 173 define an inner surface 181 having a general serpentine shape extending along the inner channel 112 of the coupler 110. Similar to the embodiment described above and depicted in FIG. 18, the first radial bulge 176 and the second radial bulge 173 are structurally configured to engage the outer conductor 16 (FIG. 2) and/or the outer braid 18 (FIG. 2) of the coaxial cable 10 (FIG. 2). By engaging the outer conductor 16 (FIG. 2) and/or the outer braid 18 (FIG. 7) of the coaxial cable 10 (FIG. 2), the first radial bulge 176 and the second radial bulge 173 form an electrical pathway between the thread 118 of the coupler 110 and the outer conductor 16 (FIG. 2) of the coaxial cable 10 (FIG. 2). While the embodiment depicted in FIG. 19 depicts the retainer 130 as defining the first and second radial bulges 176, 173, it should be understood that this is merely an example. In some embodiments, the coupler 110 may define one or both of the first and second radial bulges 176, 173.

Figure 20:
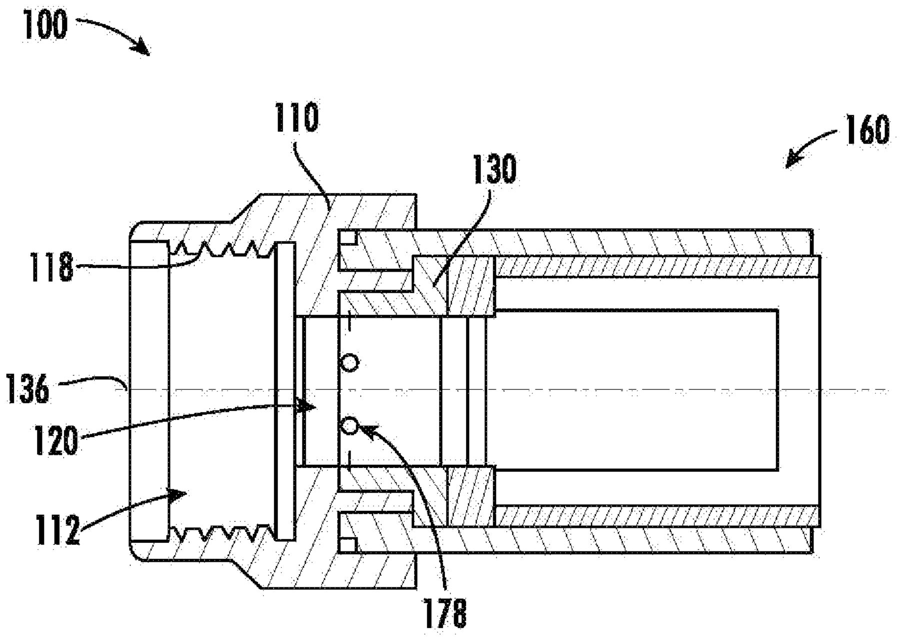
FIG. 20 schematically depicts a section view of another coaxial cable connector assembly including one or more protrusions, according to one or more embodiments shown and described herein.
Figure 21:
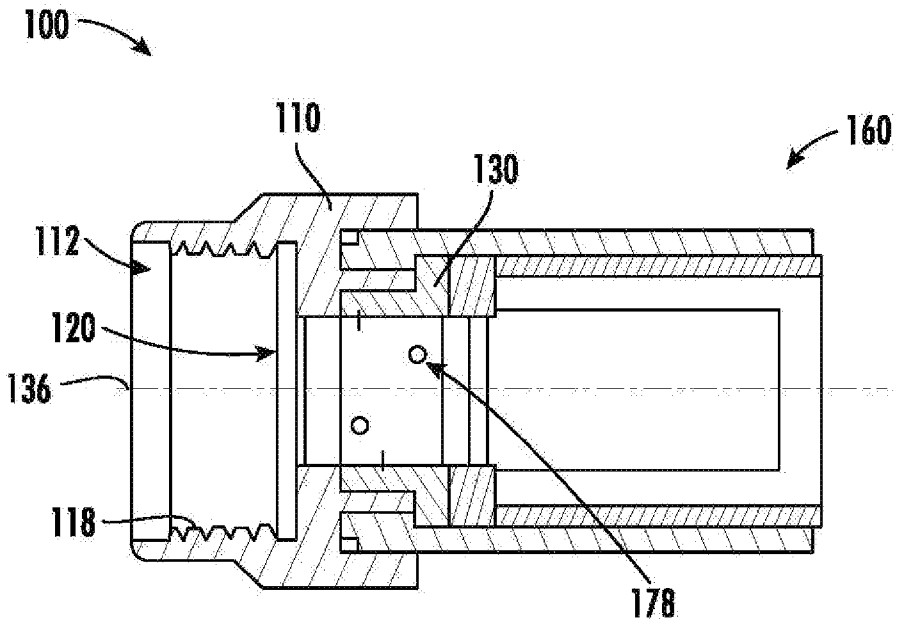
FIG. 21 schematically depicts a section view of another coaxial cable connector assembly including one or more protrusions, according to one or more embodiments shown and described herein.

Referring to FIG. 20, another embodiment of the coaxial cable connector assembly 100 is schematically depicted. Similar to the embodiments described above, the coaxial cable connector assembly 100 includes the coupler 110, the rear body 160, and the retainer 130. In the embodiment depicted in FIG. 20, at least one of the retainer 130 and the coupler 110 defines one or more protrusions 178 extending inwardly from the nominal portion 120 of the coupler 110. In embodiments, the one or more protrusions 178 are structurally configured to contact the outer conductor 16 (FIG. 2) and/or the outer braid 18 (FIG. 2) of the coaxial cable 10 (FIG. 2) forming an electrical pathway between the thread 118 of the coupler 110 and the outer conductor 16 (FIG. 2) and/or the outer braid 18 (FIG. 2) of the coaxial cable 10 (FIG. 2). In the embodiment depicted in FIG. 20, the retainer 130 defines the one or more protrusions 178, however, it should be understood that this is merely an example. For example, in some embodiments, the coupler 110 may define the one or more protrusions 178. As shown in FIG. 20, in some embodiments, the one or more protrusions 178 are aligned with one another in the axial direction. However, as shown in FIG. 21, the one or more protrusions 178 may be offset from one another in the axial direction.

Figure 22A:
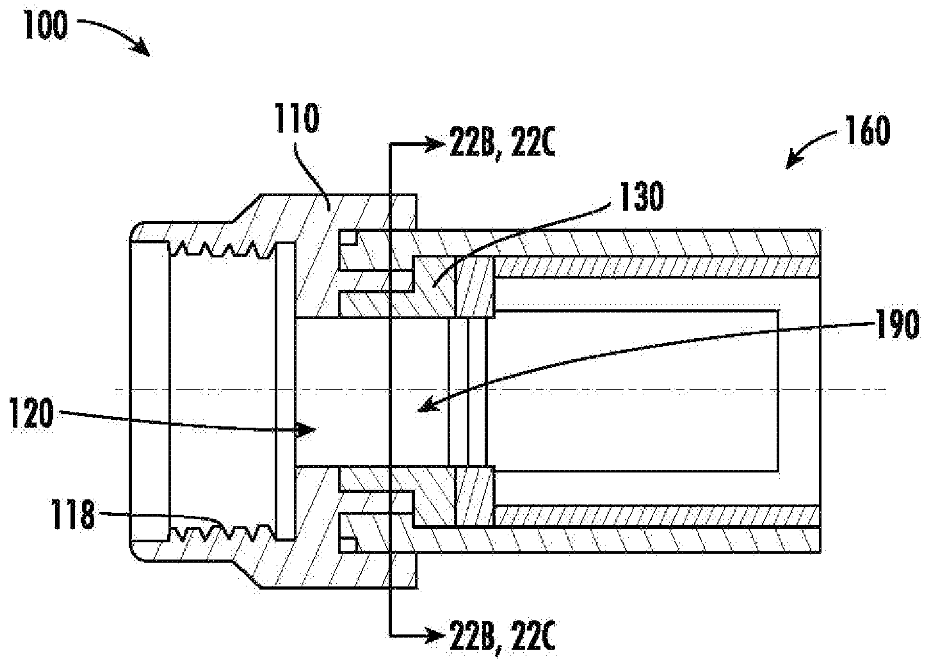
FIG. 22A schematically depicts a section view of another coaxial cable connector assembly including an engagement passage with a non-uniform span, according to one or more embodiments shown and described herein.
Figure 22B:
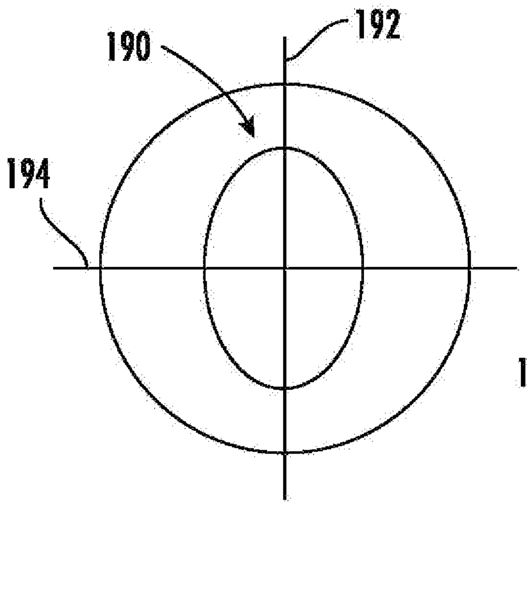
FIG. 22B schematically depicts a rear view of a coaxial cable connector assembly including an oval-shaped engagement passage, according to one or more embodiments shown and described herein.

Referring to FIGS. 22A and 22B, a section view of another embodiment of a coaxial cable connector assembly 100 is schematically depicted along section 22B-22B of FIG. 22A. Similar to the embodiments described above, the coaxial cable connector assembly 100 includes the coupler 110, the rear body 160, and the retainer 130. However, in the embodiment depicted in FIG. 22B, at least one of the retainer 130 and the coupler 110 defines an engagement passage 190 having a non-uniform span. In particular, in the embodiment depicted in FIG. 22B, the engagement passage 190 defines an ovular cross-section defining a minor axis 194 and a major axis 192 that has a span that is greater than the span of the minor axis 194. By including the ovular cross-section, at least a portion of the engagement passage 190 extends inwardly from the nominal portion 120 of the coupler 110. For example, in the embodiment depicted in FIG. 22B, portions of the engagement passage 190 along the minor axis 194 extend inwardly from the nominal portion 120 of the coupler 110 and are structurally configured to contact the outer conductor 16 (FIG. 2) and/or the outer braid 18 (FIG. 2) of the coaxial cable 10 (FIG. 2) forming an electrical pathway between the thread 118 of the coupler 110 and the outer conductor 16 (FIG. 2) and/or the outer braid 18 (FIG. 2) of the coaxial cable 10 (FIG. 2). While in the embodiment depicted in FIGS. 22A and 22B, the retainer 130 is depicted as including the engagement passage 190, it should be understood that this is merely an example. For example, in some embodiments, the coupler 110 may define some or all of the engagement passage 190.

Figure 22C:
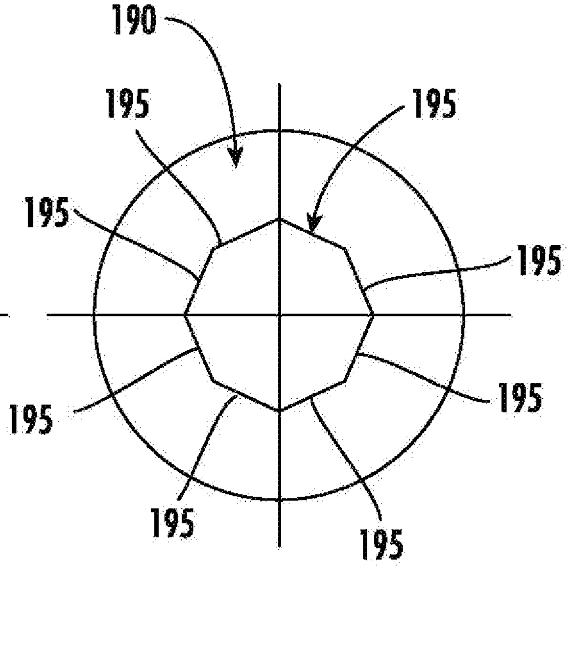
FIG. 22C schematically depicts a rear view of a coaxial cable connector assembly including a polygonal engagement passage, according to one or more embodiments shown and described herein.

Referring to FIGS. 22A and 22C, a section view of another embodiment of a coaxial cable connector assembly 100 is schematically depicted along section 22C-22C of FIG. 22A. Similar to the embodiment depicted in FIG. 22B, in the embodiment depicted in FIG. 22C, at least one of the retainer 130 and the coupler 110 defines an engagement passage 190 having a non-uniform span. In particular, in the embodiment depicted in FIG. 22C, the engagement passage 190 defines a polygonal cross-section defining a plurality of faces 195. In embodiments, a distance evaluated between opposing faces 195 defines a span that is less than the nominal portion 120 of the coupler 110. For example, in the embodiment depicted in FIG. 22C, faces 195 of the engagement passage 190 extend inwardly from the nominal portion 120 of the coupler 110 and are structurally configured to contact the outer conductor 16 (FIG. 2) and/or the outer braid 18 (FIG. 2) of the coaxial cable 10 (FIG. 2) forming an electrical pathway between the thread 118 of the coupler 110 and the outer conductor 16 (FIG. 2) and/or the outer braid 18 (FIG. 2) of the coaxial cable 10 (FIG. 2). While in the embodiment depicted in FIG. 22C, the engagement passage 190 is depicted as including an octagonal cross-section, it should be understood that the engagement passage 190 may include any suitable polygonal cross-section to engage the outer conductor 16 (FIG. 2) of the coaxial cable 10 (FIG. 2). Further, while in the embodiment depicted in FIGS. 22A and 22C, the retainer 130 is depicted as including the engagement passage 190, it should be understood that this is merely an example. For example, in some embodiments, the coupler 110 may define some or all of the engagement passage 190.

Figure 23B:
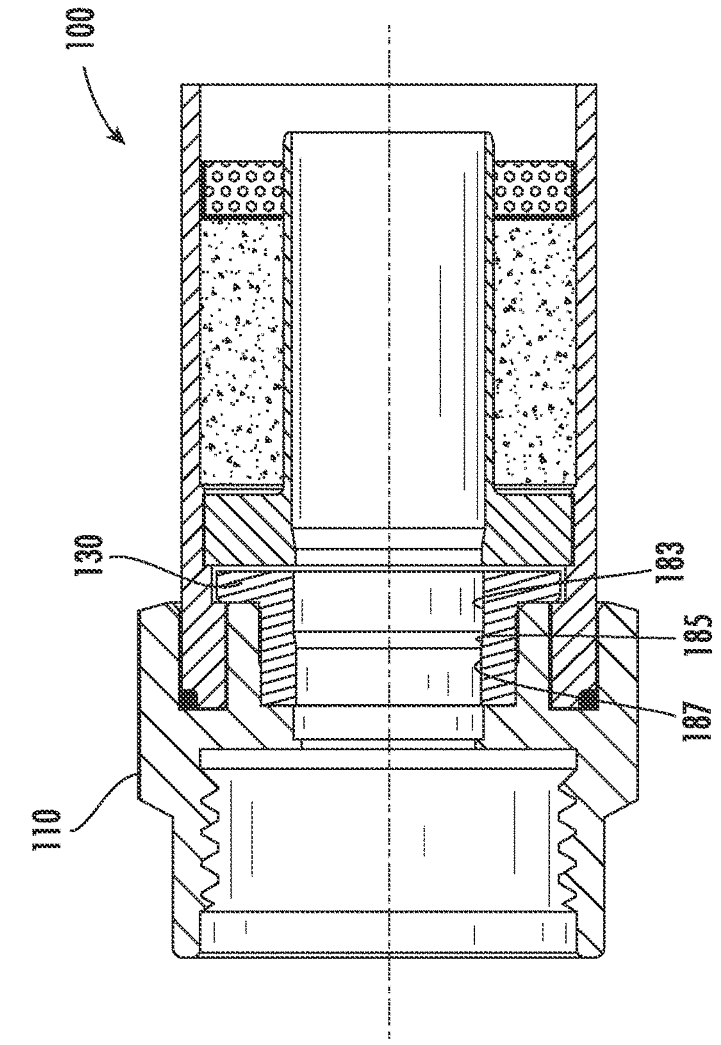
FIG. 23B schematically depicts a section view of the coaxial cable connector assembly shown in FIG. 23A.
Figure 23A:
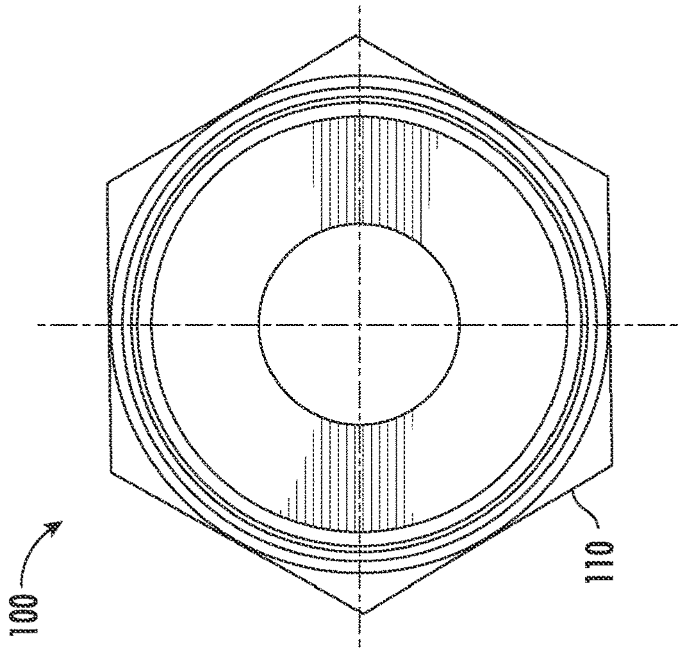
FIG. 23A schematically depicts a front view of a coaxial cable connector assembly, including a tapered area, according to one or more embodiments shown and described herein.

Referring to FIGS. 23A and 23B, another embodiment of the coaxial cable connector assembly 100 is schematically depicted. Similar to the embodiments described above, the coaxial cable connector assembly 100 includes the coupler 110, the rear body 160, and the retainer 130. However, in this embodiment, as shown particularly in FIGS. 23A and 23B, the retainer 130 includes a first inner retainer diameter 183, a tapered retainer portion 185, extending inwardly towards the coupler 110, and second inner retainer diameter 187 adjacent to the tapered portion. In embodiments, the tapered portion 185 and the second inner diameter 187 are structurally configured to contact the outer conductor 16 (FIG. 2) and/or the outer braid 18 (FIG. 2) of the coaxial cable 10 (FIG. 2) forming an electrical pathway between the thread 118 of the coupler 110 and the outer conductor 16 (FIG. 2) and/or the outer braid 18 (FIG. 2) of the coaxial cable 10 (FIG. 2). In the embodiment depicted in FIGS. 23A and 23B, the retainer 130 defines a tapered portion, however, it should be understood that this is merely an example. For example, in some embodiments, a plurality of tapered portion may be included on the retainer 130.

Accordingly, it should now be understood that embodiments described herein are directed coaxial cable connector assemblies including outer conductor engagement features. In particular, embodiments disclosed herein are directed to coaxial cable connector assemblies including outer conductor engagement features that electrically couple threads of a coupler of the coaxial cable connector assembly to an outer conductor of a coaxial cable. By electrically coupling the outer conductor of the coaxial cable to the threads of the coupler, coaxial cable connector assemblies described herein may make an electrical connection between the port of a device and the outer conductor of the coaxial cable, even if the coupler of the coaxial cable connector assembly is not fully seated on the port of the device.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

It is noted that recitations herein of a component of the present disclosure being “structurally configured” in a particular way, to embody a particular property, or to function in a particular manner, are structural recitations, as opposed to recitations of intended use. More specifically, the references herein to the manner in which a component is “structurally configured” denotes an existing physical condition of the component and, as such, is to be taken as a definite recitation of the structural characteristics of the component.

It is noted that terms like “preferably,” “commonly,” and “typically,” when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms “substantially” and “about” are utilized herein to represent the inherent degree of uncertainty that may be attributed to any quantitative comparison, value, measurement, or other representation. The terms “substantially” and “about” are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term “wherein” as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term “comprising.”

What is claimed is:

1. A coaxial cable connector assembly, comprising:

a rear body, defining a cable channel therethrough and an annular ridge that extends inwardly along the cable channel, wherein the rear body is structurally configured to be coupled to a coaxial cable;

a coupler rotatably engaged with and positioned forward of the rear body, wherein the coupler defines:

an inner channel extending through the coupler between a front portion of the coupler and a rear portion of the coupler positioned opposite the front portion;

a thread at the front portion of the coupler, wherein the thread is structurally configured to couple the coaxial cable connector assembly to a port of a device;

a nominal portion defining a nominal inner span along the inner channel; and an outer conductor engagement portion, integrally coupled to the thread, that tapers inwardly from the nominal portion that extends forwardly along the inner channel to the front portion of the coupler, wherein when the coaxial cable connector assembly is assembled, the inward taper of the outer conductor engagement portion is configured to contact an outer conductor of the coaxial cable, forming an electrical pathway between the thread of the coupler and the outer conductor of the coaxial cable; and a retainer engaged with the coupler and the rear body, the retainer defining a tube portion coaxial with the inner channel of the coupler and a flange that extends outwardly from the tube portion, wherein the flange engages with the annular ridge of the rear body and restricts axial movement of the rear body with respect to the retainer.

2. The coaxial cable connector assembly of claim 1, wherein the retainer further defines an annular bevel positioned between the flange and the tube portion.

3. The coaxial cable connector assembly of claim 1, wherein the retainer is coupled to the coupler via one or more structural adhesives.

4. The coaxial cable connector assembly of claim 1, wherein the flange is inwardly deformed such that the rear body is configured to be slid over the flange of the retainer to couple the rear body to the coupler.

5. The coaxial cable connector assembly of claim 2, wherein the coupler defines a longitudinal axis extending between the front portion and the rear portion of the coupler, and wherein the annular bevel is oriented inwardly toward the longitudinal axis.

6. The coaxial cable connector assembly of claim 2, wherein the annular bevel limits impingement of the flange against the outer conductor as the flange of the retainer deforms inwardly, reducing contact of the outer conductor as the rear body is coupled to the coupler.

* * * * *